US009965824B2

(12) United States Patent
Zhu et al.

(10) Patent No.: US 9,965,824 B2
(45) Date of Patent: May 8, 2018

(54) ARCHITECTURE FOR HIGH PERFORMANCE, POWER EFFICIENT, PROGRAMMABLE IMAGE PROCESSING

(71) Applicant: Google LLC, Mountain View, CA (US)

(72) Inventors: Qiuling Zhu, San Jose, CA (US); Ofer Shacham, Palo Alto, CA (US); Albert Meixner, Mountain View, CA (US); Jason Rupert Redgrave, Mountain View, CA (US); Daniel Frederic Finchelstein, Redwood City, CA (US); David Patterson, Kensington, CA (US); Neeti Desai, Sunnyvale, CA (US); Donald Stark, Palo Alto, CA (US); Edward T. Chang, Saratoga, CA (US); William R. Mark, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 14/694,828

(22) Filed: Apr. 23, 2015

(65) Prior Publication Data
US 2016/0314555 A1    Oct. 27, 2016

(51) Int. Cl.
G06T 1/20        (2006.01)
G06T 1/60        (2006.01)
(Continued)

(52) U.S. Cl.
CPC .......... G06T 1/20 (2013.01); G06T 1/60 (2013.01); H04N 5/378 (2013.01); H04N 5/91 (2013.01)

(58) Field of Classification Search
CPC . G06T 1/20; G06T 1/60; H04N 5/378; H04N 5/91
(Continued)

(56) References Cited

U.S. PATENT DOCUMENTS 4,445,177 A    4/1984   Bratt et al.
4,835,712 A    5/1989   Derbin et al.
(Continued)

FOREIGN PATENT DOCUMENTS

EP    0293701 A2     12/1988
JP    2013090070      5/2013
(Continued)

OTHER PUBLICATIONS

Chao et al., "Pyramid Architecture for 3840x2160 Quad Full High Definition 3D Frames/s Video Acquisition", IEEE Transactions on Circuits and Systems for Video Technology, Nov. 1, 2010, pp. 1499-1507.*

(Continued)

Primary Examiner — Jin-Cheng Wang
(74) Attorney, Agent, or Firm — Fish & Richardson P.C.

(57) ABSTRACT

An apparatus is described. The apparatus includes an image processing unit. The image processing unit includes a network. The image processing unit includes a plurality of stencil processor circuits each comprising an array of execution unit lanes coupled to a two-dimensional shift register array structure to simultaneously process multiple overlapping stencils through execution of program code. The image processing unit includes a plurality of sheet generators respectively coupled between the plurality of stencil processors and the network. The sheet generators are to parse input line groups of image data into input sheets of image data for processing by the stencil processors, and, to form output line groups of image data from output sheets of image data received from the stencil processors. The image processing unit includes a plurality of line buffer units coupled to the network to pass line groups in a direction from producing stencil processors to consuming stencil processors to implement an overall program flow.

21 Claims, 31 Drawing Sheets

(51) Int. Cl.
*H04N 5/378* (2011.01)
*H04N 5/91* (2006.01)
(58) Field of Classification Search
USPC ........ 345/502, 505, 506, 519, 532, 536, 537
See application file for complete search history.

(56) References Cited

U.S. PATENT DOCUMENTS

| | | | |
|---|---|---|---|
| 4,935,894 | A | 6/1990 | Ternes et al. |
| 5,253,308 | A | 10/1993 | Johnson |
| 5,612,693 | A | 3/1997 | Craft et al. |
| 5,751,864 | A | 5/1998 | Moriwake et al. |
| 5,892,962 | A | 4/1999 | Cloutier |
| 6,031,573 | A | 2/2000 | MacCormack |
| 6,049,859 | A | 4/2000 | Gliese et al. |
| 6,366,289 | B1 | 4/2002 | Johns |
| 6,587,158 | B1 | 7/2003 | Adams et al. |
| 6,728,862 | B1 | 4/2004 | Wilson |
| 6,745,319 | B1 | 6/2004 | Balmer et al. |
| 6,970,196 | B1 | 11/2005 | Masatoshi et al. |
| 7,010,177 | B1 | 3/2006 | Mattison |
| 7,167,890 | B2 | 1/2007 | Lin et al. |
| 7,200,287 | B2 | 4/2007 | Fukuda et al. |
| 7,286,717 | B2 | 10/2007 | Nomizu |
| 7,583,851 | B2 | 9/2009 | Kudo et al. |
| 7,941,634 | B2 | 5/2011 | Georgi et al. |
| 8,156,284 | B2 | 4/2012 | Vorbach et al. |
| 8,321,849 | B2 | 11/2012 | Nickolls et al. |
| 8,436,857 | B2 | 5/2013 | Twilleager |
| 8,508,612 | B2 | 8/2013 | Cote et al. |
| 8,543,843 | B1 | 9/2013 | Cheng et al. |
| 8,650,384 | B2 | 2/2014 | Lee et al. |
| 8,749,667 | B2 | 6/2014 | Noraz et al. |
| 8,786,614 | B2 | 7/2014 | Curry et al. |
| 8,797,323 | B2 | 8/2014 | Salvi et al. |
| 8,823,736 | B2 | 9/2014 | Barringer et al. |
| 8,970,884 | B2 | 3/2015 | Tsuji et al. |
| 8,976,195 | B1 | 3/2015 | Lindholm et al. |
| 2003/0005365 | A1 | 1/2003 | Wilson |
| 2005/0270412 | A1 | 12/2005 | Kamon et al. |
| 2006/0044576 | A1 | 3/2006 | Tabata et al. |
| 2007/0047828 | A1 | 3/2007 | Ishii et al. |
| 2007/0080969 | A1 | 4/2007 | Yamaura |
| 2007/0156729 | A1 | 7/2007 | Shaylor |
| 2008/0111823 | A1 | 5/2008 | Fan et al. |
| 2008/0244222 | A1 | 10/2008 | Supalov et al. |
| 2008/0266302 | A1* | 10/2008 | Andre ............... G06F 13/4234 345/519 |
| 2009/0002390 | A1 | 1/2009 | Kuno |
| 2009/0228677 | A1 | 9/2009 | Liege |
| 2009/0300621 | A1 | 12/2009 | Mantor et al. |
| 2009/0317009 | A1 | 12/2009 | Ren |
| 2010/0122105 | A1 | 5/2010 | Arsian et al. |
| 2010/0182042 | A1* | 7/2010 | Law ..................... G06F 17/5054 326/38 |
| 2010/0188538 | A1 | 7/2010 | Sugawa et al. |
| 2011/0055495 | A1 | 3/2011 | Wolford et al. |
| 2011/0087867 | A1 | 4/2011 | Jacobson et al. |
| 2011/0125768 | A1 | 5/2011 | Shibao |
| 2011/0153925 | A1 | 6/2011 | Bains et al. |
| 2012/0320070 | A1 | 12/2012 | Arvo |
| 2013/0027416 | A1 | 1/2013 | Vaithianathan et al. |
| 2013/0202051 | A1 | 8/2013 | Zhou |
| 2013/0243329 | A1 | 9/2013 | Oro Garcia et al. |
| 2013/0314428 | A1 | 11/2013 | Chen et al. |
| 2013/0318544 | A1 | 11/2013 | Kuroda et al. |
| 2014/0019486 | A1* | 1/2014 | Majumdar ........ G06F 17/30424 707/780 |
| 2014/0028876 | A1 | 1/2014 | Mills |
| 2014/0136816 | A1 | 5/2014 | Krig |
| 2014/0282611 | A1 | 9/2014 | Campbell et al. |
| 2015/0106596 | A1 | 4/2015 | Vorbach et al. |
| 2015/0281602 | A1 | 10/2015 | Stavrou et al. |
| 2016/0210720 | A1* | 7/2016 | Taylor ..................... G06T 1/60 |
| 2016/0219225 | A1 | 7/2016 | Zhu et al. |

FOREIGN PATENT DOCUMENTS

| | | |
|---|---|---|
| WO | WO 9409595 A1 | 4/1994 |
| WO | WO 2007/071883 A2 | 6/2007 |

OTHER PUBLICATIONS

Wahib et al., "Scalable Kernel Fusion for Memory-Bound GPU Applications", SC14: International Conference for High Performance Computing, Networking, Storage and Analysis, Nov. 16, 2014, pp. 191-202.*

Adobe Systems, "Adobe Photoshop CS6", released in May 2012, pp. 1-4.*

Oosterhout, Optimized Pixel Template Image Correlator, Master Thesis, Aug. 19, 1992, 74 pages.

Zhou, Minhua, et al., "Parallel Tools in HEVC for High-Throughput Processing," Applications of Digital Processing, XXXV, Proc. of SPI, vol. 8499, (Jan. 1, 2012), pp. 1-13.

Chen et al., "CRISP: Coarse-Grained Reconfigurable Image Stream Processor for Digital Still Cameras and Camcorders," IEEE Transactions on Circuits and Systems for Video Technology, Sep. 2008, 14 pages.

Cardells-Tormo et al., "Area-efficient 2-D Shift-variant Convolvers for FPGA-based Digital Image Processing," IEEE Workshop on Signal Processing Systems Design and Implementation, Nov. 2, 2005, 5 pages. Levinthal, "Parallel Computers for Graphics Applications", ACM, 1987, pp. 193-198.

Gupta, et al., "A VLSI Architecture for Updating Raster-Scan Displays", Computer Graphics, vol. 15, No. 3, Aug. 1981, pp. 71-78.

Henretty, et al., "A Stencil Compiler for Short-Vector SIMID Architectures", ACM, ICS'13, Jun. 10-14, 2013, Eugene, Oregon, pp. 13-24.

Spampinato, et al., "A Basic Linear Algebra Compiler", ACM, CGO'14, Feb. 15-19, 2014, Orlando FI, pp. 23-32.

Stojanov, et al., "Abstracting Vector Architectures in Library Generators: Case Study Convolution Filters", Array 14, ACM, Jun. 11, 2014, UK, pp. 14-19.

DeVito, et al., "Terra: A Multi-Stage Language for High-Performance Computing", PLDI'13, Jun. 16-22, 2013, Seattle, Washington, 11 pages.

Sedaghati, et al., "SIVEC: A Vector Instruction Extension for High Performance Stencil Computation," Parallel Architectures and Compilation Techniques, Oct. 10, 2011, 12 pages.

Bolotoff, Paul V., "Alpha-The History in Facts and Comments" http://alasir.com/articles/a;pha_history/alpha_21164_21164pc. html, Last modification date Apr. 22, 2007, 5 pages.

Adams, et al. "The Frankencamera: An Experimental Platform for Computational Photography", ACM Transactions on Graphics, vol. 29, No. 4, Article 29, Publication Jul. 2010, 12 pages.

Levinthal, et al., "Chap-A SIMD Graphics Processor", Computer Graphics, vol. 18, No. 3, Jul. 1984, pp. 77-82.

Eichenberger, et al., "Optimizing Compiler for the Cell Processor" PACT, Tuesday, Sep. 20, 2005, Part 1, pp. 1-16.

Eichenberger, et al., "Optimizing Compiler for the Cell Processor" PACT, Tuesday, Sep. 20, 2005, Part 2, pp. 17-32.

Kapasi, et al. "The Imagine Stream Processor", IEEE, International Conference on Computer Design: VLSI in Computers and Processors (ICCD'02), 2002, 17 pages.

Molnar, et al., "PixelFlow: High-Speed Rendering Using Image Composition" proceedings of Siggraph 92, Computer Graphics, 26, Jul. 2, 1992, 10 pages.

S.F. Reddaway,"DAP—A Distributed Processor Array", ISCA '73 Proceedings of the First Ann. Symposium on Computer Architecture, pp. 61-65, Dec. 9, 1973.

M.J. Duff, "CLIP 4: A Large Scale Integrated Circuit Array Parallel Processor," Proc. IEEE. Int'l Joint Conf. Pattern Recognition, . . . Jan. 2004, pp. 728-733.

Qadeer, et al., "Convolution Engine: Balancing Efficiency & Flexibility in Specialized Computing", ISCA '13 Tel-Aviv, Israel, ACM 2013, pp. 24-35.

(56) References Cited

OTHER PUBLICATIONS

Shacham, et al. "Smart Memories Polymorphic Chip Multiprocessor", Proceedings of the 46th Design Automation Conference (OAC), San Francisco, CA, Jul. 2009.
DeVito, et al.,"First-class Runtime Generation of High-Performance Types using Exotypes", PLDI'14, Jun. 9-11, ACM, 12 pages, 2014.
Clearspeed Whitepaper: CSX Processor Architecture, www.clearspeed.com, 2007, 16 pages.
NVIDIA, "PTX:Parallel Thread Execution ISA Version 1.4", Aug. 23, 2010, 135 pages.
Silicon Hive: "Silicon System Design of Media and Communications Applications", Jun. 13, 2007, 22 pages.
Khronos, SPIR 2.0 "Provisional Specification to Enable Compiler Innovation on Diverse Parallel Architectures", Aug. 11, 2014, 2 pages.
Arasan "Silicon Hive Announces New Image Signal Processor", Eindhoven, the Netherlands, May 16, 2006, http://www.design-reuse.com/13362/silicon-hive-image-signal-processor.html, 3 pages.
Hegarty, et al., "Darkroom: Compiling High-Level Image Processing Code into Hardware Pipelines", Proceedings of ACM SIGGRAPH, Jul. 2014, 11 pages.
SPIR, The SPIR Specification, Version 2.0, Revision Date Jun. 5, 2014, 40 pages.
Hanrahan, Pat, "Domain-Specific Languages for Heterogeneous GPU Computing", NVIDIA Technology Conference, Oct. 2, 2009, 30 pages.
Shacham, et al., "Rethinking Digital Design: Why Design Must Change", IEEE micro Magazine, Nov./Dec. 2010.
Goldstein, et al., "PipeRench: A Coprocessor for Streaming Multimedia Acceleration", Carnegie Mellow University, Research Showcase @CMU, Appears in the 26th Annual International Symposium on Computer Architecture, May 1999, Atlanta, Georgia, 14 pages.
Khawam, et al., "The Reconfigurable Instruction Cell Array", IEEE Transactions on Very Large Scale Integration (VLSI) Systems, vol. 16, No. 1, Jan. 2008, pp. 75-85.
"ChimeraTM: The NVIDIA Computational Photography Architecture" Whitepaper, NVIDIA Corporation 2013, 15 pages.
Barry, et al., "Always-On Vision Processing Unit for Mobile Applications", IEEE Micro, Mar./Apr. 2015, pp. 56-66.
EyeQ2TM, "Vision System on a Chip", Mobileye, Sep. 2007, 4 pages.
Horowitz, Mark, "Computing's Energy Problem: (and what we can do about it)", IEEE, International Solid-State Circuits Conference 2014, 46 pages.
"Multioutput Scaler Reference Design" Altera Corporation, Application Note AN-648-1.0, Aug. 2012, 18 pages.
Nightingale, Edmund B., et al., "Helios: Heterogeneous Multiprocessing with Satellite Kernels", *SOSP '09, Oct. 11-14, 2009, Big Sky, Montana, USA.*, (Oct. 11, 2009), 14 pages.
Chao et al., "Pyramid Architecture for 3840×2160 Quad Full High Definition 30 Frames/s Video Acquisition", IEEE Transactions on Circuits and Systems for Video Technology, Nov. 1, 2010, 10 pages.
Ragan-Kelley et al., "Halide: A Language and Compiler for Optimizing Parallelism, Locality, and Recomputation in Image Processing Pipelines", Jun. 16, 2013, 12 pages.
Wahib et al., "Scalable Kernel Fusion for Memory-Bound GPU Applications", SC14: International Conference for High Performance Computing, Networking, Storage and Analysis, Nov. 16, 2014, 12 pages.
Dykes et al., "Communication and computation patterns of large scale image convolutions on parallel architectures", Parallel Processing Symposium, Jan. 1, 1994, 6 pages.
Yu et al., "Optimizing Data Intensive Window-based Image Processing on Reconfigurable Hardware Boards", Proc. IEEE Workshop on Signal Processing System Design and Implementation, Nov. 2, 2005, 6 pages.
PCT/US2016/026221, International Search Report and Written Opinion, mailed Jul. 5, 2016, 13 pages.

Pelc, Oscar, "Multimedia Support in the i.MX31 and i.MX31L Applications Processors", Freescale Semiconductor, Inc., Feb. 2006, http://cache.freescale.com/files/32bit/doc/white_paper/IMX31MULTIWP.pdf, 12 pages.
Mody, et al., "High Performance and Flexible Imaging Sub-System." in Advances in Computing, Communications and Informatics (ICACCI), 2014 International Conference, pp. 545-548. IEEE, 2014.
Van der Wal, et al., "The Acadia Vision Processor", IEEE proceedings of International Workshop on Computer Applications for Machine Perception, Sep. 2000, http://citeseerx.ist.psu.edu/viewdoc/download?doi=10.1.1.32.3830&rep=rep1&type=pdf, 10 pages.
Stein, et al., "A Computer Vision System on a Chip: A Case Study From the Automotive Domain." IEEE Computer Society Conference, p. 130, 2005.
Tanabe, et al., "Visconti: multi-VLIW image Recognition Processor Based on Configurable Processor [obstacle detection applications]", Custom Integrated Circuits Conference, IEEE, 2003, http://ieeexplore.ieee.org/document/1249387/?arnumber=1249387&tag=1.
Mandal, et al., "An Embedded Vision Engine (EVE) for Automotive Vision Processing." In Circuits and Systems (ISCAS), 2014 IEEE Symposium, pp. 49-52, IEEE, 2014.
Bushey, et al., "Flexible Function-Level Acceleration of Embedded Vision Applications Using the Pipelined Vision Processor." In Signals, Systems and Computers, 2013 Asilomar Conference, pp. 1447-1452, IEEE, 2013.
Moloney, David, "1 TOPS/W Software Programmable Media Processor." Hot Chips 23 Symposium (HCS), IEEE, Aug. 2011, 24 pages.
Moloney, et al., "Myriad 2: Eye of the Computational Vision Storm", Hot Chips 26 Symposium (HCS), IEEE, Aug. 2014, 18 pages.
Parker, Richard, "Embedding Computer Vision in Electronic Devices: How New Hardware and Software Choices Have Changed the Designer's Approach", Future Technology Magazine, pp. 22-23, Feb. 2013.
Ahn, et al., "Evaluating the Image Stream Architecture." In ACM SIGARCH Computer Architecture News, vol. 32, No. 2, IEEE Computer Society, Jun. 2004, 14 pages.
Balfour, et al., "An Energy-Efficient Processor Architecture for Embedded Systems" IEEE Computer Architecture Letters 7, No. 1 p. 29-32, May 2008.
Khailany, et al., "A Programmable 512 GOPS Stream Processor for Signal, Image, and Video Processing", IEEE Journal of Solid-State Circuits, vol. 43, No. 1, pp. 202-213, Jan. 2008.
Olofsson, et al., "A 25 GFLOPS/Watt Software Programmable Floating Point Accelerator" High Performance Embedded Computing Conference, 2010, 2 pages.
de Dinechin, et al., "A Clustered Manycore Processor Architecture for Embedded and Accelerated Applications." In High Performance Extreme Computing Conference (HPEC), IEEE, pp. 1-6, Sep. 2013.
Codrescu, et al., "Hexagon DSP: An Architecture Optimized for Mobile Multimedia and Communications." IEEE Micro vol. 34, Issue 2, pp. 34-43, Mar. 2014.
Pham, et al., "NeuFlow: Dataflow Vision Processing System-On-A-Chip." IEEE 55th International Midwest Symposium, Aug. 2012, 4 pages.
Farabet, et al., "Neuflow: A Runtime Reconfigurable Dataflow Processor for Vision." IEEE Computer Society Conference, pp. 109-116, Jun. 2011.
Farabet, et al., "Hardware Accelerated Convolutional Neural Networks for Synthetic Vision Systems." Proceedings of 2010 IEEE International Symposium, pp. 257-260, Jun. 2010.
Chen, et al., "DaDianNao: A Machine-Learning Supercomputer." 47th Annual IEEE/ACM International Symposium, pp. 609-622, IEEE, Dec. 2014.
CEVA-MM3101: An Imaging—Optimized DSP Core Swings for an Embedded Vision Home Run, http://www.bdti.com/InsideDSP/2012/01/24/CEVA, Jan. 19, 2012, 3 pages.

(56) References Cited

OTHER PUBLICATIONS

Stream Processors, Inc., Company History—Foundational Work in Stream Processing initiated in 1995, https://en.wikipedia.org/wiki/Stream_Processors,_Inc, 5 pages.

Gentile, et al., "Image Processing Chain for Digital Still Cameras Based on SIMPil Architecture." ICCP International Conference Workshops, pp. 215-222, IEEE, Jun. 2005.

Hameed, et al., "Understanding Sources of Inefficiency in General-Purpose Chips." ACM SIGARCH Computer Architecture News, vol. 38, No. 3, pp. 37-47, 2010.

Galal, et al., "FPU Generator for Design Space Exploration." $21^{st}$ IEEE Symposium on Computer Arithmetic (ARITH), Apr. 2013, 10 pages.

Dally, William J., "Computer architecture is all about interconnect." Proceedings of $8^{th}$ International Symposium High-Perf. Comp. Architecture, Feb. 2002, 11 pages.

Chenyun, et al., "A Paradigm Shift in Local Interconnect Technology Design in the Era of Nanoscale Multigate and Gate-All-Around Devices," IEEE Electron Device Letters, vol. 36, No. 3, pp. 274-26, Mar. 2015.

SCP2200: Image Cognition Processors*, https://www.element14.com/community/docs/DOC-50984/l/scp2200-image-cognition-processors, Oct. 25, 2012, 2 pages.

SCP2200: Image Cognition Processors Family [Product Brief]*, https://www.element14.com/community/docs/DOC-50990, Oct. 26, 2012, 2 pages.

Stream Processors, Inc. Announces Storm-1 Family of Data-Parallel Digital Signal Processors, ISSCC 2007, Feb. 12, 2007, 3 pages. http://www.businesswire.com/news/home/20070212005230/en/Stream-Processors-Announces-Storm-1-Family-Data-Parallel-Digital.

NVIDIA—NVIDIA's Next Generation CUDA™ Compute Architecture: Kepler™,GK110/210, 2014, 23 pages, http://international.download.nvidia.com/pdf/kepler/NVIDIA-Kepler-GK110-GK210-Architecture-Whitepaper.pdf.

MPPA—MANYCORE, Product Family Overview http://www.kairay.eu/IMG/pdf/FLYER_MPPA_MANYCORE-4.pdf, Feb. 2014, 2 pages.

McIntosh-Smith, "A Next-Generation Many-Core Processor With Reliability, Fault Tolerance and Adaptive Power Management Features Optimized for Embedded and High Performance Computing Applications" in Proceedings of the High Performance Embedded Computing Conference (HPEC) 2008, pp. 1-2, 5.

SemiWiki.com—New CEVA-ZM4 Vision IP Does Point clouds and and More: Published Feb. 27, 2015, https://www.semiwiki.com/forum/content/4354-new-ceva-xm4-vision-ip-does-point-clouds-more.html.

Shacham, Ofer, "Chip Multiprocessor Generator: Automatic Generation of Custom and Heterogeneous Complete Platforms" Dissertation—Stanford University, May 2011, 190 pages. Part 1.

Shacham, Ofer, "Chip Multiprocessor Generator: Automatic Generation of Custom and Heterogeneous Complete Platforms" Dissertation—Stanford University, May 2011, 190 pages. Part 2.

NVIDIA Tegra K1—A New Era in Mobile Computing—Whitepapers—Jan. 2014, 26 pages.

NVIDIA Tegra X1—Nvidia'S New Mobile Superchip—Whitepapers—Jan. 2015, 41 pages.

Yadav,et al., "A Fast and Area Effiecient 2-D Convolver for Real Time Image Processing", 2008.

Ferreira, et al. More Efficient Terrain Viewshed Computation on Massive Datasets UsingExternal Memory, 2012.

International Preliminary Report on Patentability issued in International Application No. PCT/US2016/026221, dated Nov. 2, 2017, 9 pages.

* cited by examiner

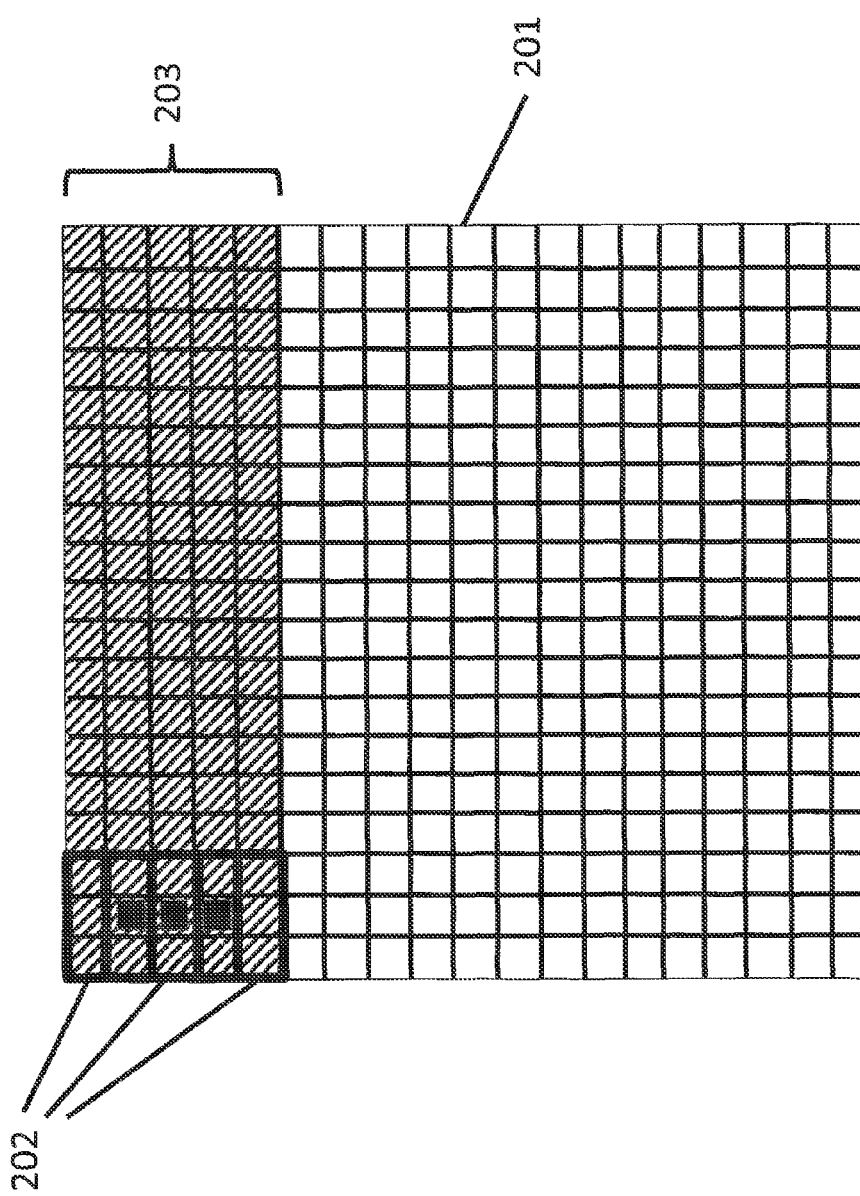

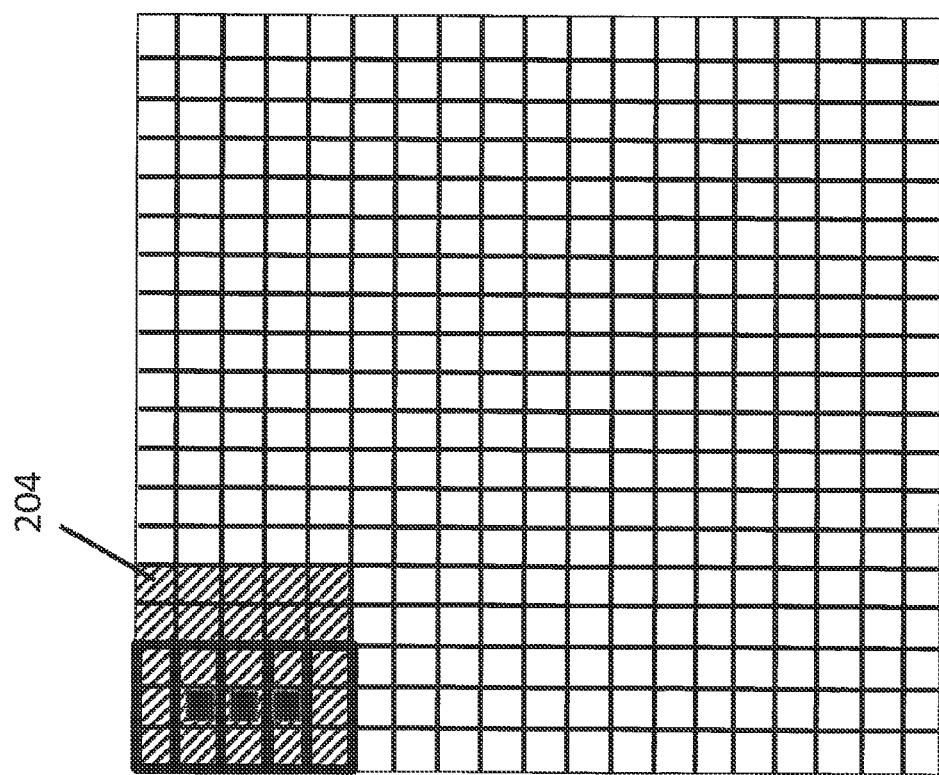

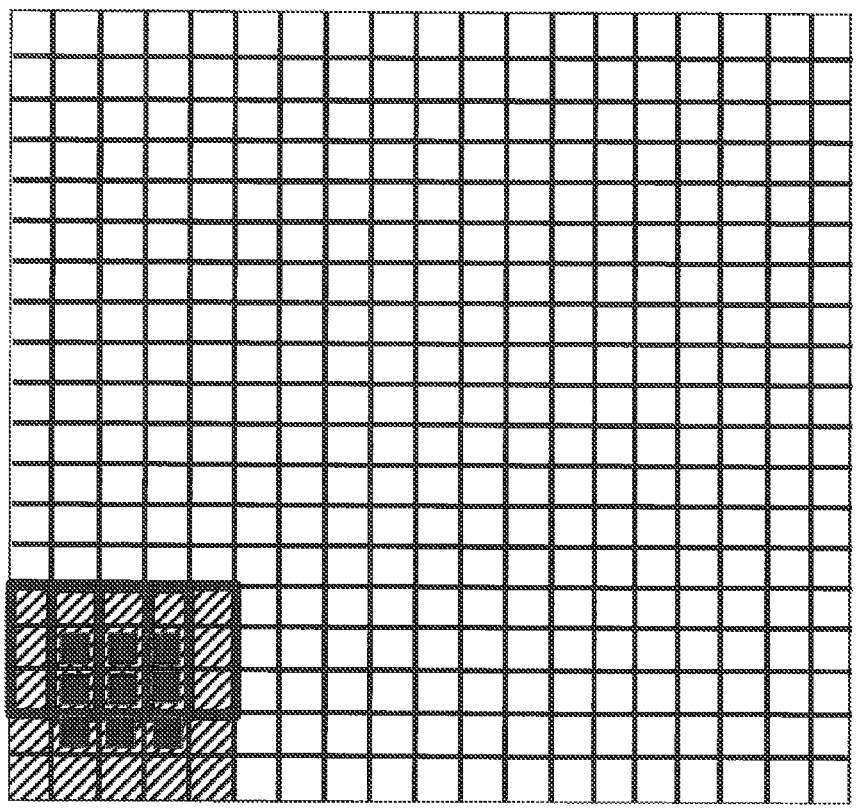

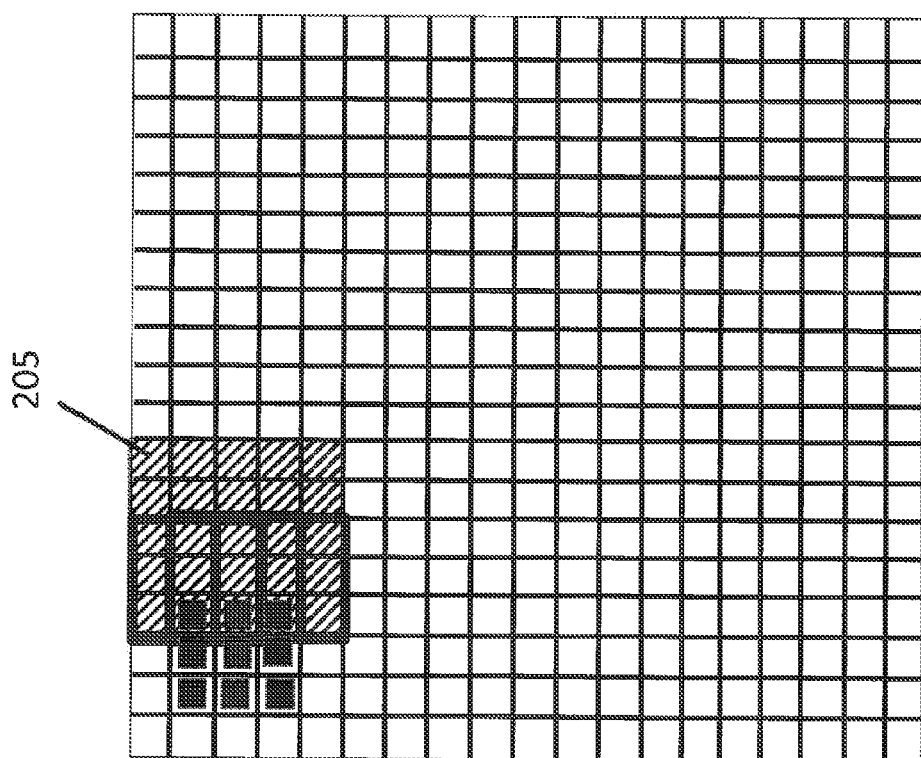

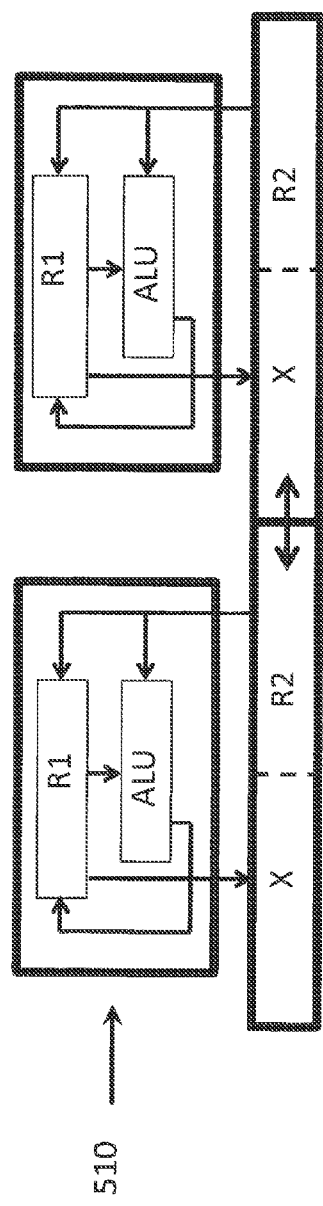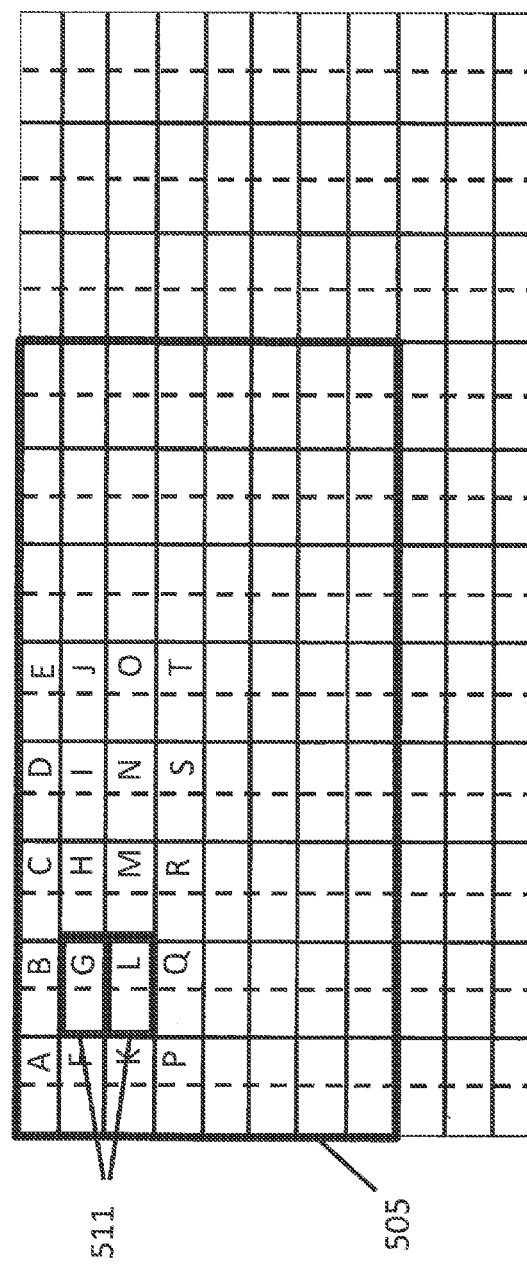
Fig. 5a

```
// thread X1: process stencil 1//
shift down 1
shift right 1
load // put A in R1
shift left 1
R1 <= ADD R1, R2 // add A, B // thread X2: process stencil 2//
shift down 1
shift right 1
load // put F in R1
shift left 1
R1 <= ADD R1, R2 // add F, G
```

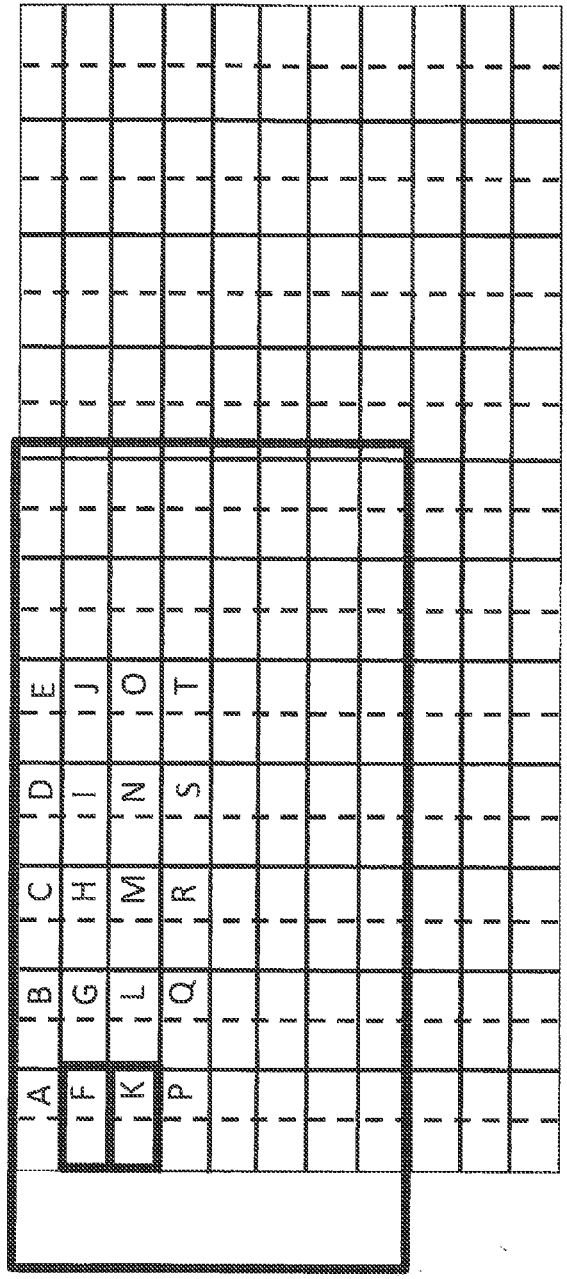

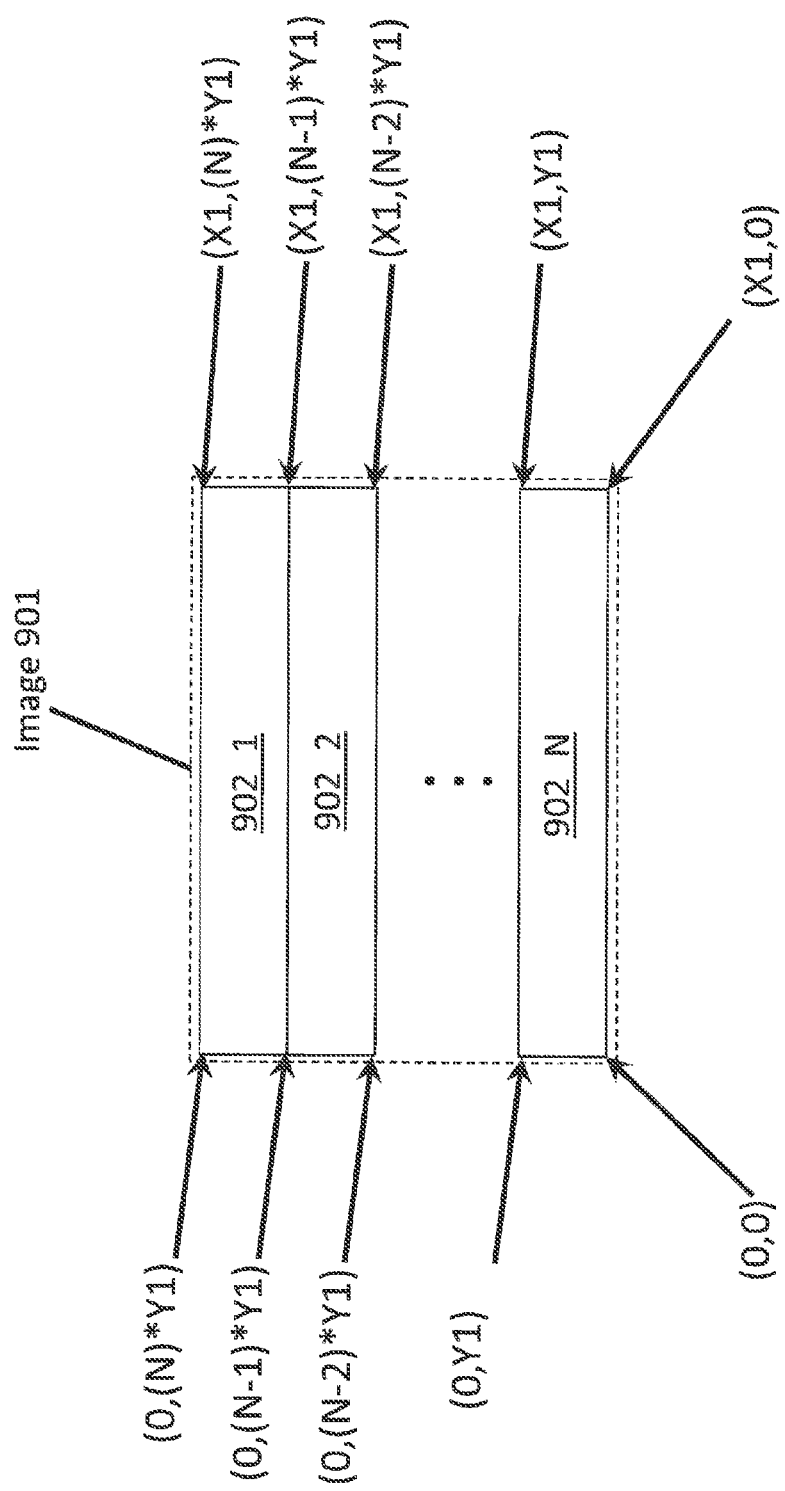

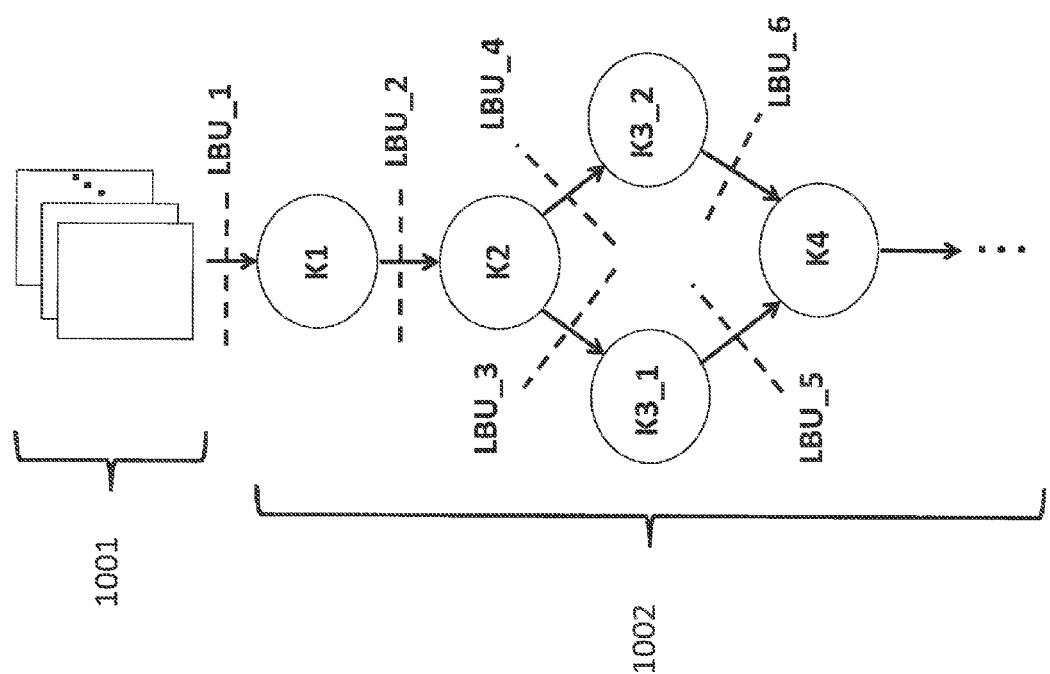

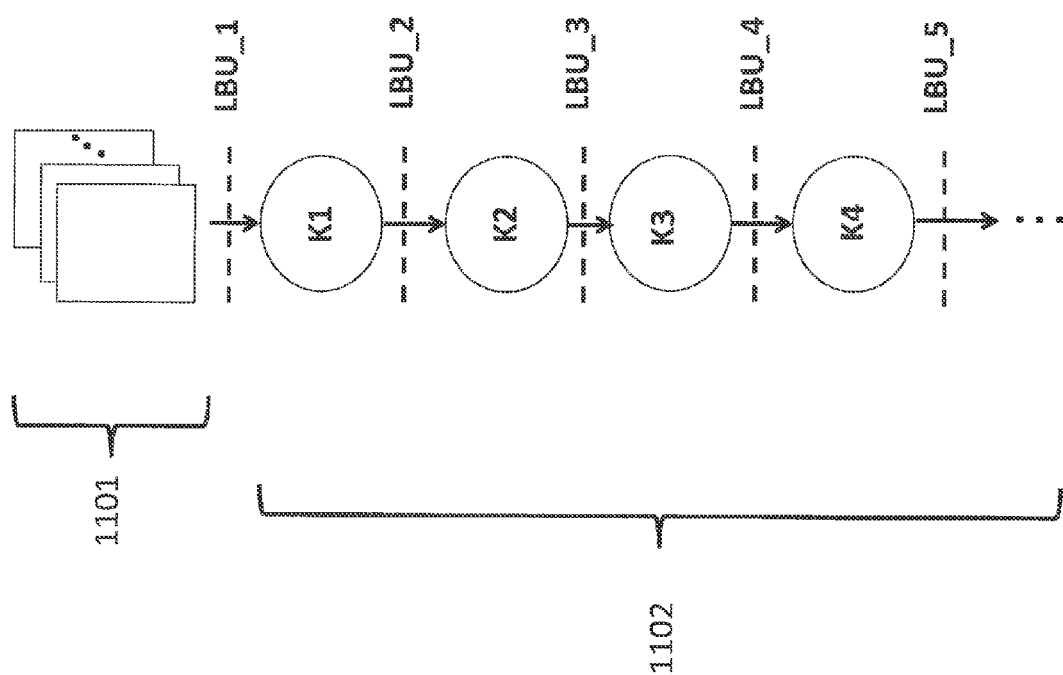

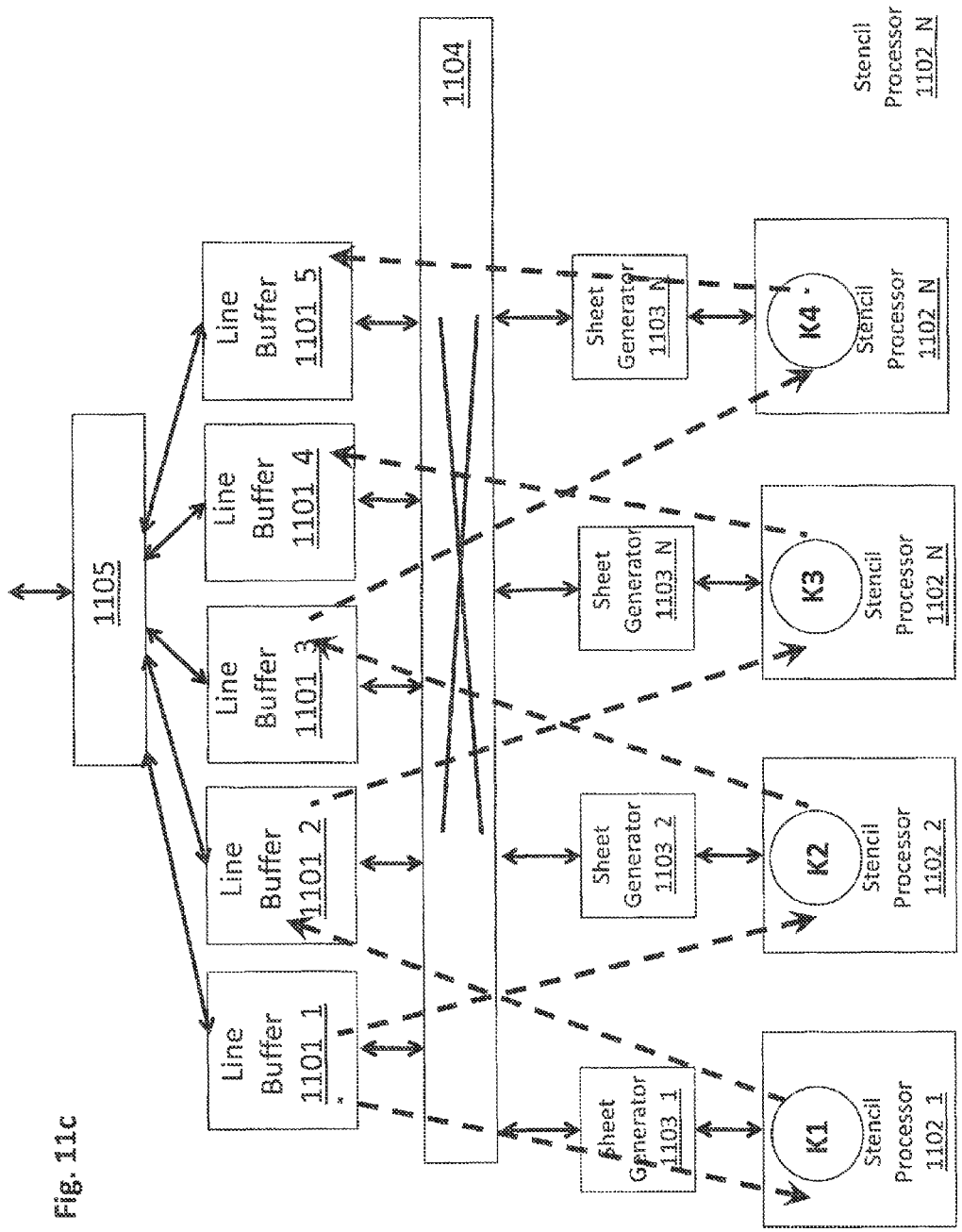

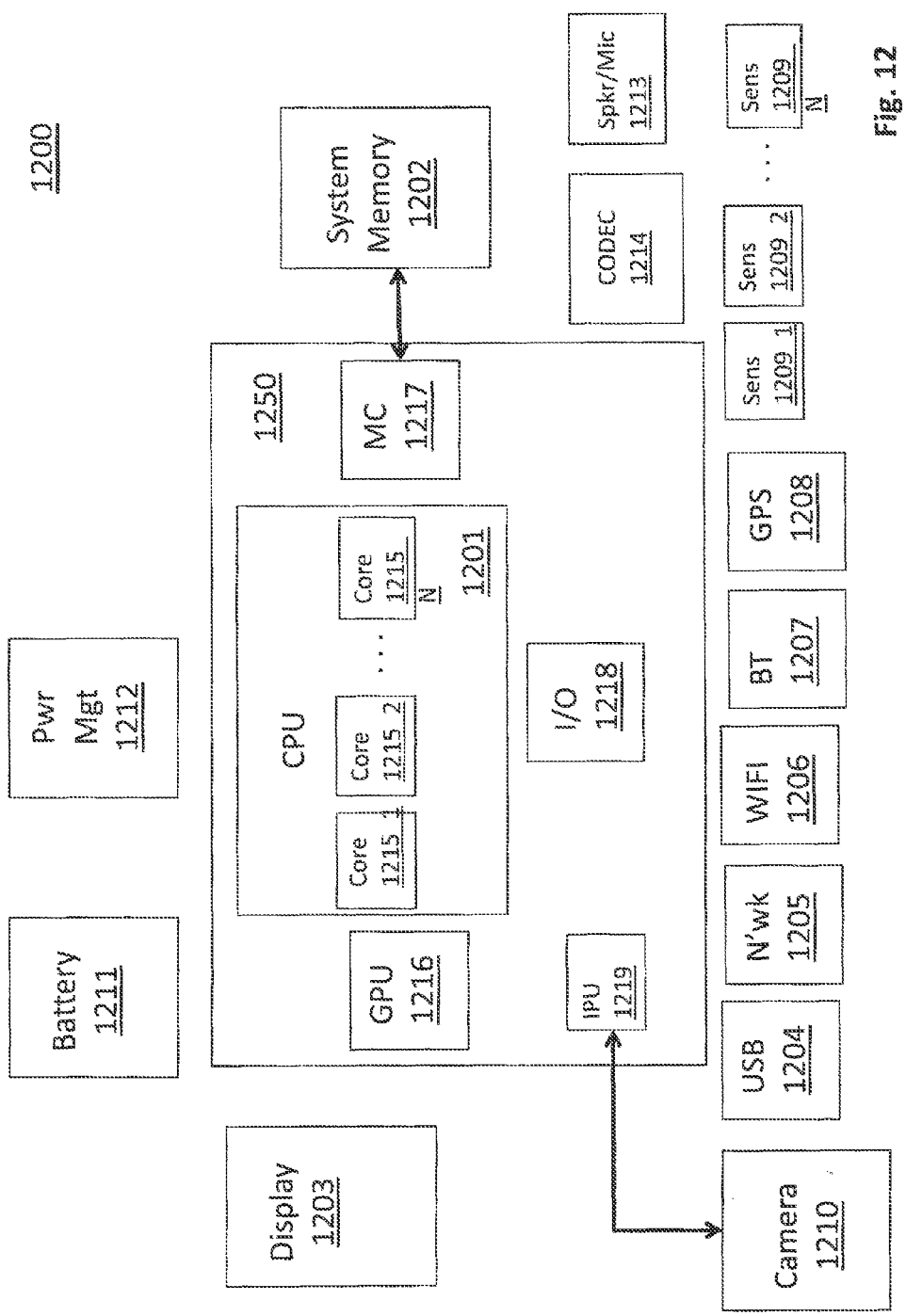

ARCHITECTURE FOR HIGH PERFORMANCE, POWER EFFICIENT, PROGRAMMABLE IMAGE PROCESSING

FIELD OF INVENTION

The field of invention pertains generally to image processing, and, more specifically, to an architecture for high performance, power efficient, programmable image processing.

BACKGROUND

Image processing typically involves the processing of pixel values that are organized into an array. Here, a spatially organized two dimensional array captures the two dimensional nature of images (additional dimensions may include time (e.g., a sequence of two dimensional images) and data type (e.g., colors). In a typical scenario, the arrayed pixel values are provided by a camera that has generated a still image or a sequence of frames to capture images of motion. Traditional image processors typically fall on either side of two extremes.

A first extreme performs image processing tasks as software programs executing on a general purpose processor or general purpose-like processor (e.g., a general purpose processor with vector instruction enhancements). Although the first extreme typically provides a highly versatile application software development platform, its use of finer grained data structures combined with the associated overhead (e.g., instruction fetch and decode, handling of on-chip and off-chip data, speculative execution) ultimately results in larger amounts of energy being consumed per unit of data during execution of the program code.

A second, opposite extreme applies fixed function hardwired circuitry to much larger blocks of data. The use of larger (as opposed to finer grained) blocks of data applied directly to custom designed circuits greatly reduces power consumption per unit of data. However, the use of custom designed fixed function circuitry generally results in a limited set of tasks that the processor is able to perform. As such, the widely versatile programming environment (that is associated with the first extreme) is lacking in the second extreme.

A technology platform that provides for both highly versatile application software development opportunities combined with improved power efficiency per unit of data remains a desirable yet missing solution.

SUMMARY

An apparatus is described. The apparatus includes an image processing unit (IPU). The image processing unit includes a network. The image processing unit includes a plurality of stencil processor circuits each comprising an array of execution unit lanes coupled to a two-dimensional shift register array structure to simultaneously process multiple overlapping stencils through execution of program code. The image processing unit includes a plurality of sheet generators respectively coupled between the plurality of stencil processors and the network. The sheet generators are to parse input line groups of image data into input sheets of image data for processing by the stencil processors, and, to form output line groups of image data from output sheets of image data received from the stencil processors. The image processing unit includes a plurality of line buffer units coupled to the network to pass line groups in a direction from producing stencil processors to consuming stencil processors to implement an overall program flow.

LIST OF FIGURES

The following description and accompanying drawings are used to illustrate embodiments of the invention. In the drawings:

FIGS. 2a, 2b, 2c, 2d and 2e depict the parsing of image data into a line group, the parsing of a line group into a sheet and the operation performed on a sheet with overlapping stencils;

FIGS. 5a, 5b, 5c, 5d, 5e, 5f, 5g, 5h, 5i, 5j and 5k depict an example of the use of a two-dimensional shift array and an execution lane array to determine a pair of neighboring output pixel values with overlapping stencils;

Figure 8:
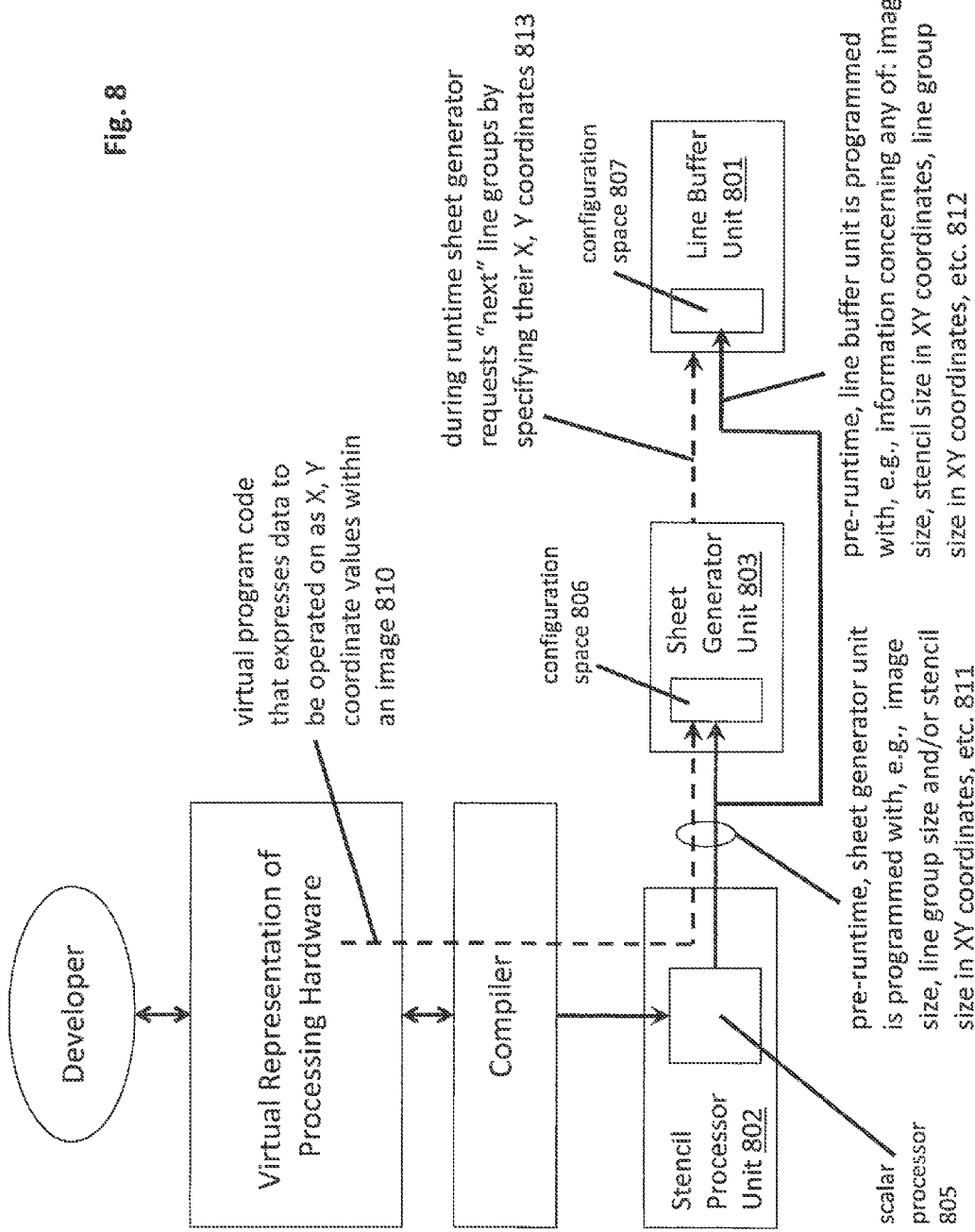
Figure 9B:
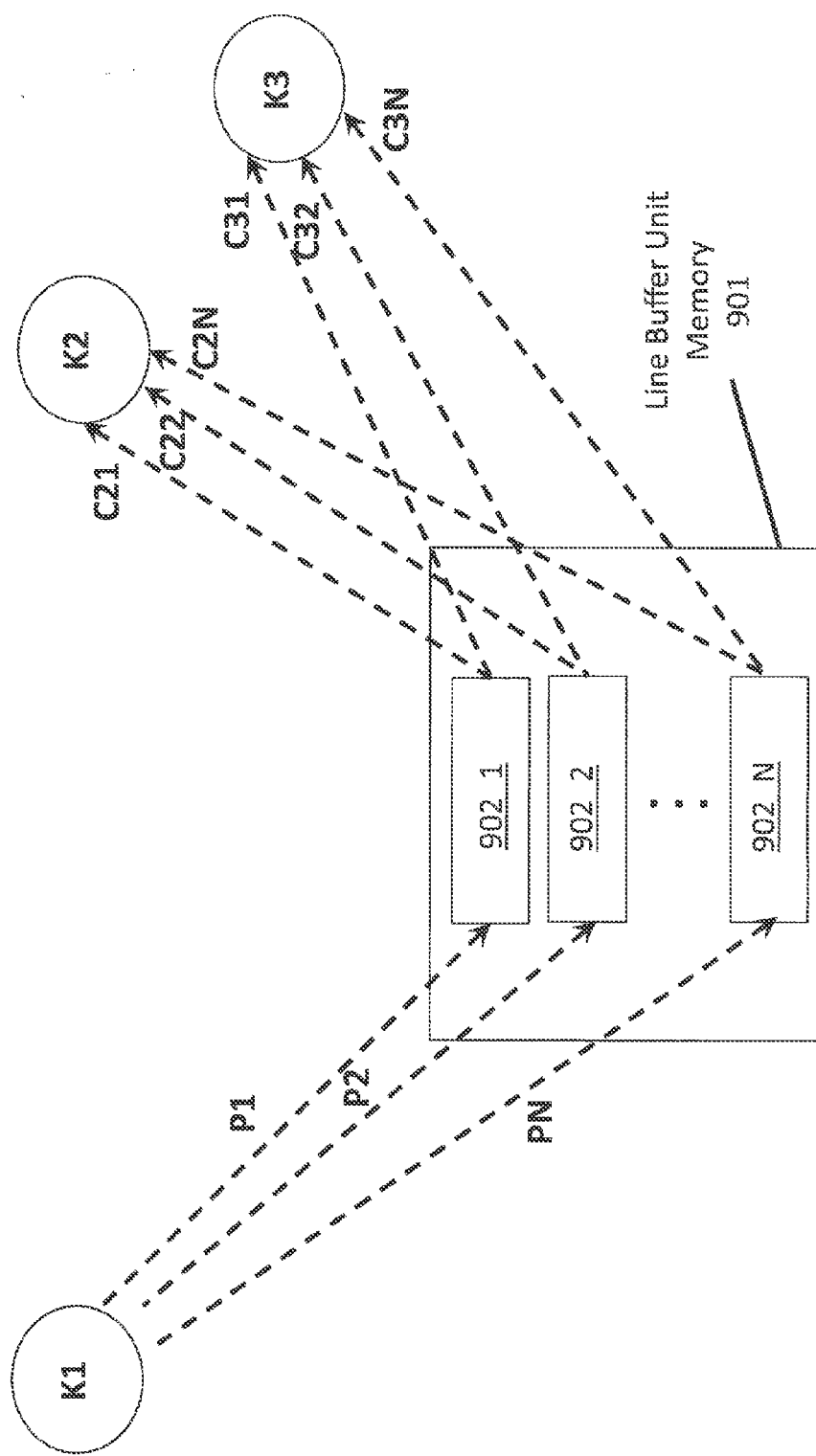
Figure 10B:
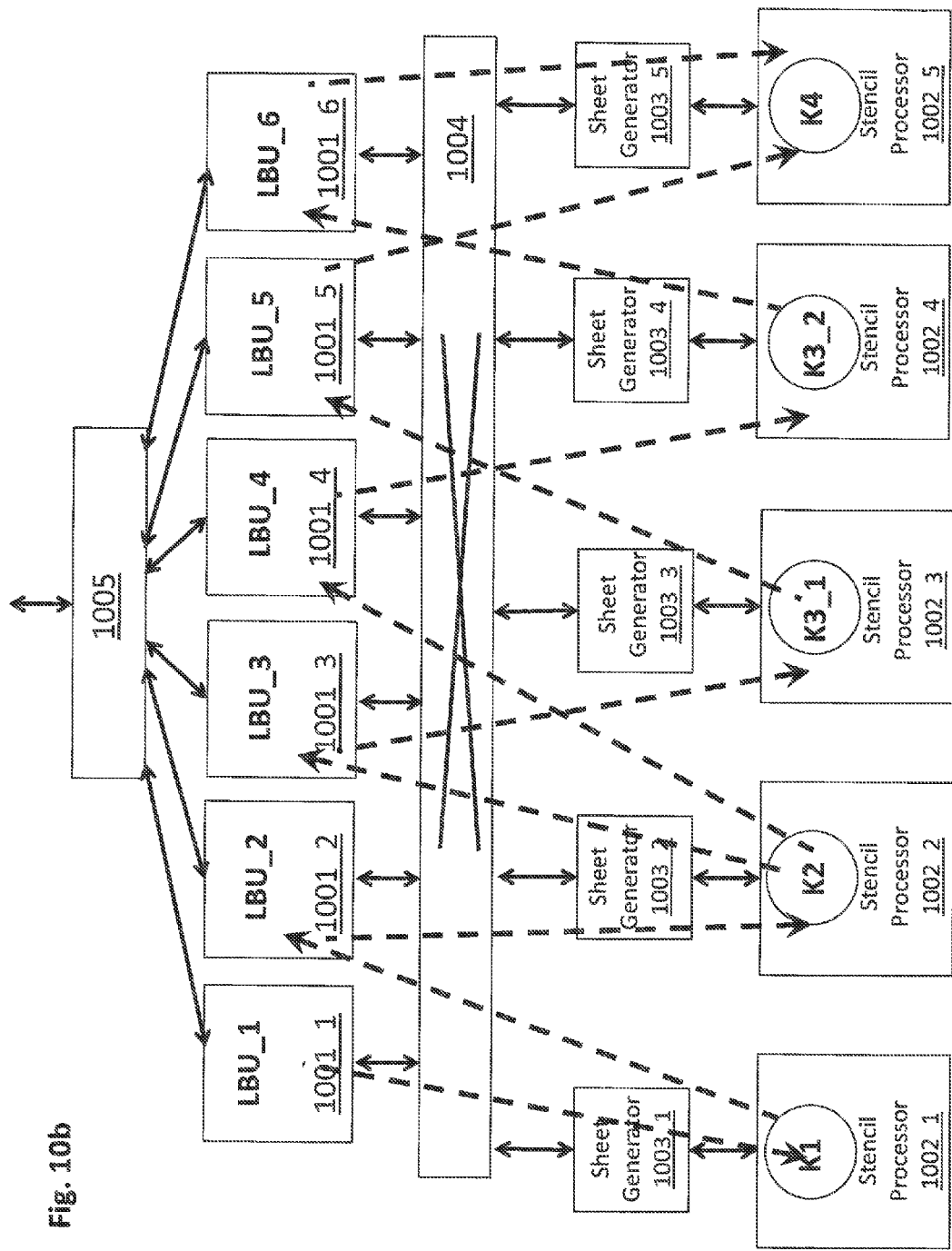
Figure 11B:
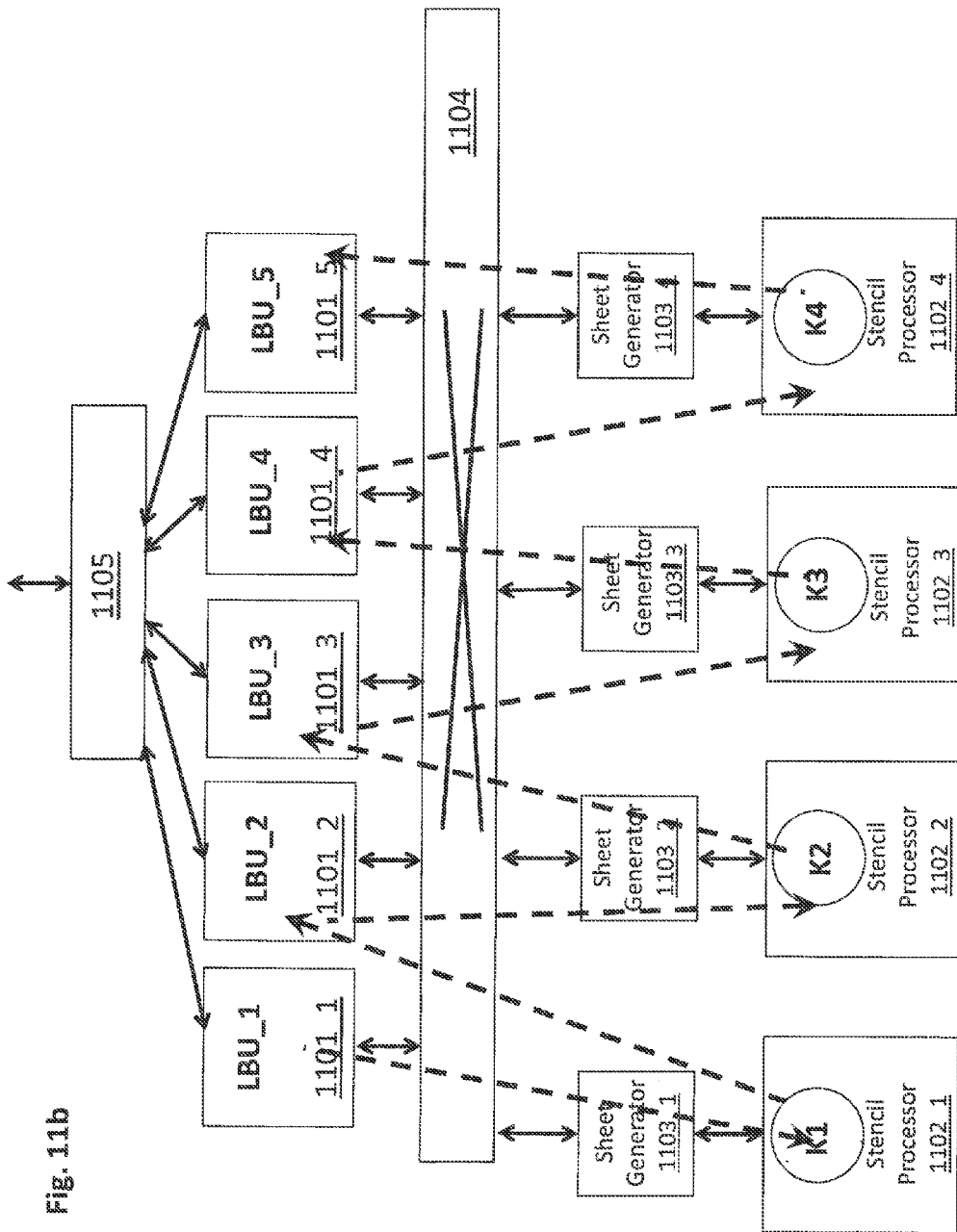

FIG. 8 pertains to a procedure for configuring an image processor;

FIGS. 9a and 9b pertain to the operation of a line buffer unit;

FIGS. 10a and 10b pertain to a DAG program flow;

FIGS. 11a, 11b and 11c pertain to a pipeline program flow;

FIG. 12 shows an exemplary computing system.

DETAILED DESCRIPTION a. Image Processor Hardware Architecture and Operation

Figure 1:
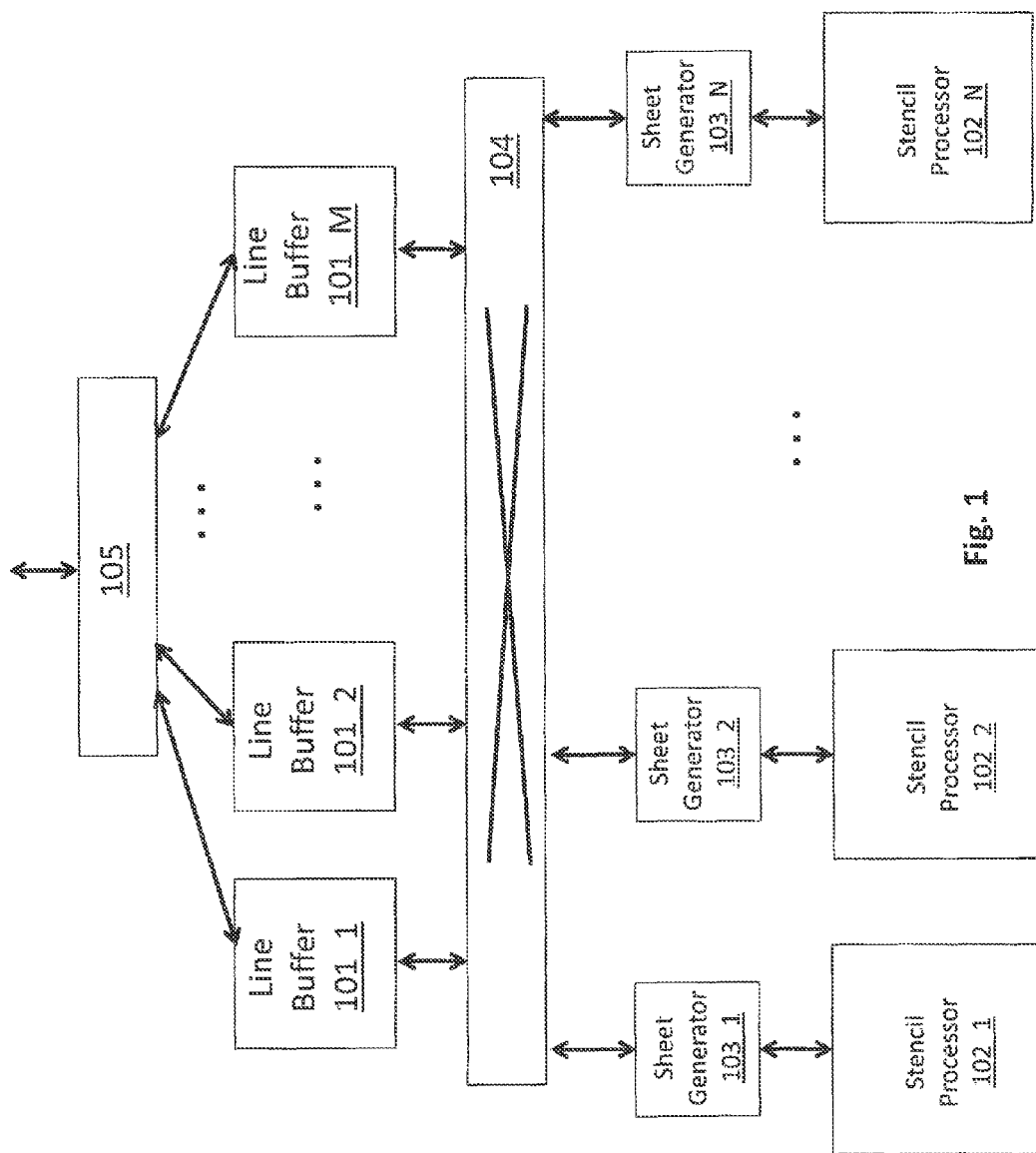
FIG. 1 shows an embodiment of an image processor hardware architecture.

FIG. 1 shows an embodiment of an architecture 100 for an image processor implemented in hardware. The image processor may be targeted, for example, by a compiler that converts program code written for a virtual processor within a simulated environment into program code that is actually executed by the hardware processor. As observed in FIG. 1, the architecture 100 includes a plurality of line buffer units 101_1 through 101_M interconnected to a plurality of stencil processor units 102_1 through 102_N and corresponding sheet generator units 103_1 through 103_N through a network 104 (e.g., a network on chip (NOC) including an on chip switch network, an on chip ring network or other kind of network). In an embodiment, any line buffer unit may connect to any sheet generator and corresponding stencil processor through the network 104.

In an embodiment, program code is compiled and loaded onto a corresponding stencil processor 102 to perform the image processing operations earlier defined by a software developer (program code may also be loaded onto the stencil processor's associated sheet generator 103, e.g., depending on design and implementation). In at least some instances an image processing pipeline may be realized by loading a first kernel program for a first pipeline stage into a first stencil processor 102_1, loading a second kernel program for a second pipeline stage into a second stencil processor 102_2, etc. where the first kernel performs the functions of the first stage of the pipeline, the second kernel performs the functions of the second stage of the pipeline, etc. and additional control flow methods are installed to pass output image data from one stage of the pipeline to the next stage of the pipeline.

In other configurations, the image processor may be realized as a parallel machine having two or more stencil processors 102_1, 102_2 operating the same kernel program code. For example, a highly dense and high data rate stream of image data may be processed by spreading frames across multiple stencil processors each of which perform the same function.

In yet other configurations, essentially any DAG of kernels may be loaded onto the hardware processor by configuring respective stencil processors with their own respective kernel of program code and configuring appropriate control flow hooks into the hardware to direct output images from one kernel to the input of a next kernel in the DAG design.

As a general flow, frames of image data are received by a macro I/O unit 105 and passed to one or more of the line buffer units 101 on a frame by frame basis. A particular line buffer unit parses its frame of image data into a smaller region of image data, referred to as a "line group", and then passes the line group through the network 104 to a particular sheet generator. A complete or "full" singular line group may be composed, for example, with the data of multiple contiguous complete rows or columns of a frame (for simplicity the present specification will mainly refer to contiguous rows). The sheet generator further parses the line group of image data into a smaller region of image data, referred to as a "sheet", and presents the sheet to its corresponding stencil processor.

In the case of an image processing pipeline or a DAG flow having a single input, generally, input frames are directed to the same line buffer unit 101_1 which parses the image data into line groups and directs the line groups to the sheet generator 103_1 whose corresponding stencil processor 102_1 is executing the code of the first kernel in the pipeline/DAG. Upon completion of operations by the stencil processor 102_1 on the line groups it processes, the sheet generator 103_1 sends output line groups to a "downstream" line buffer unit 101_2 (in some use cases the output line group may be sent_back to the same line buffer unit 101_1 that earlier had sent the input line groups).

One or more "consumer" kernels that represent the next stage/operation in the pipeline/DAG executing on their own respective other sheet generator and stencil processor (e.g., sheet generator 103_2 and stencil processor 102_2) then receive from the downstream line buffer unit 101_2 the image data generated by the first stencil processor 102_1. In this manner, a "producer" kernel operating on a first stencil processor has its output data forwarded to a "consumer" kernel operating on a second stencil processor where the consumer kernel performs the next set of tasks after the producer kernel consistent with the design of the overall pipeline or DAG.

A stencil processor 102 is designed to simultaneously operate on multiple overlapping stencils of image data. The multiple overlapping stencils and internal hardware processing capacity of the stencil processor effectively determines the size of a sheet. Here, within a stencil processor 102, arrays of execution lanes operate in unison to simultaneously process the image data surface area covered by the multiple overlapping stencils.

As will be described in more detail below, in various embodiments, sheets of image data are loaded into a two-dimensional register array structure within the stencil processor 102. The use of sheets and the two-dimensional register array structure is believed to effectively provide for power consumption improvements by moving a large amount of data into a large amount of register space as, e.g., a single load operation with processing tasks performed directly on the data immediately thereafter by an execution lane array. Additionally, the use of an execution lane array and corresponding register array provide for different stencil sizes that are easily programmable/configurable.

FIGS. 2a through 2e illustrate at a high level embodiments of both the parsing activity of a line buffer unit 101, the finer grained parsing activity of a sheet generator unit 103 as well as the stencil processing activity of the stencil processor 102 that is coupled to the sheet generator unit 103.

FIG. 2a depicts an embodiment of an input frame of image data 201. FIG. 2a also depicts an outline of three overlapping stencils 202 (each having a dimension of 3 pixels×3 pixels) that a stencil processor is designed to operate over. The output pixel that each stencil respectively generates output image data for is highlighted in solid black. For simplicity, the three overlapping stencils 202 are depicted as overlapping only in the vertical direction. It is pertinent to recognize that in actuality a stencil processor may be designed to have overlapping stencils in both the vertical and horizontal directions.

Because of the vertical overlapping stencils 202 within the stencil processor, as observed in FIG. 2a, there exists a wide band of image data within the frame that a single stencil processor can operate over. As will be discussed in more detail below, in an embodiment, the stencil processors process data within their overlapping stencils in a left to right fashion across the image data (and then repeat for the next set of lines, in top to bottom order). Thus, as the stencil processors continue forward with their operation, the number of solid black output pixel blocks will grow right-wise horizontally. As discussed above, a line buffer unit 101 is responsible for parsing a line group of input image data from an incoming frame that is sufficient for the stencil processors to operate over for an extended number of upcoming cycles. An exemplary depiction of a line group is illustrated as a shaded region 203. In an embodiment, the line buffer unit 101 can comprehend different dynamics for sending/receiving a line group to/from a sheet generator. For example, according to one mode, referred to as "full group", the complete full width lines of image data are passed between a line buffer unit and a sheet generator. According to a second mode, referred to as "virtually tall", a line group is passed initially with a subset of full width rows. The remaining rows are then passed sequentially in smaller (less than full width) pieces.

With the line group 203 of the input image data having been defined by the line buffer unit and passed to the sheet generator unit, the sheet generator unit further parses the line group into finer sheets that are more precisely fitted to the hardware limitations of the stencil processor. More specifically, as will be described in more detail further below, in an embodiment, each stencil processor consists of a two dimensional shift register array. The two dimensional shift register array essentially shifts image data "beneath" an array of execution lanes where the pattern of the shifting causes each execution lane to operate on data within its own respective stencil (that is, each execution lane processes on its own stencil of information to generate an output for that stencil). In an embodiment, sheets are surface areas of input image data that "fill" or are otherwise loaded into the two dimensional shift register array.

As will be described in more detail below, in various embodiments, there are actually multiple layers of two dimensional register data that can be shifted on any cycle. For convenience, much of the present description will simply use the term "two-dimensional shift register" and the like to refer to structures that have one or more such layers of two-dimensional register data that can be shifted.

Figure 2C:
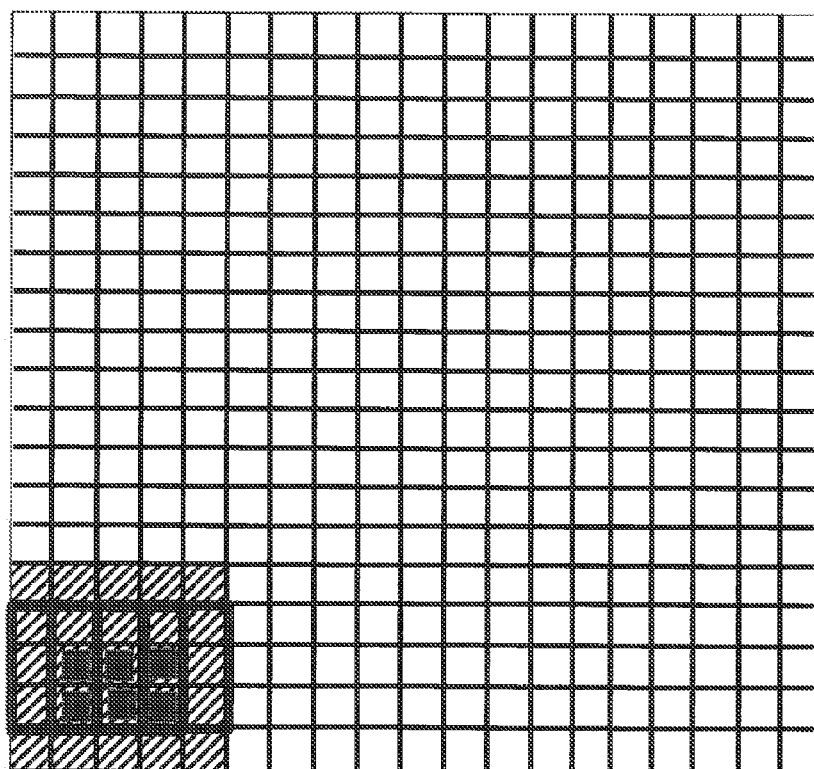

Thus, as observed in FIG. 2b, the sheet generator parses an initial sheet 204 from the line group 203 and provides it to the stencil processor (here, the sheet of data corresponds to the shaded region that is generally identified by reference number 204). As observed in FIGS. 2c and 2d, the stencil processor operates on the sheet of input image data by effectively moving the overlapping stencils 202 in a left to right fashion over the sheet. As of FIG. 2d, the number of pixels for which an output value could be calculated from the data within the sheet is exhausted (no other pixel positions can have an output value determined from the information within the sheet). For simplicity the border regions of the image have been ignored.

As observed in FIG. 2e the sheet generator then provides a next sheet 205 for the stencil processor to continue operations on. Note that the initial positions of the stencils as they begin operation on the next sheet is the next progression to the right from the point of exhaustion on the first sheet (as depicted previously in FIG. 2d). With the new sheet 205, the stencils will simply continue moving to the right as the stencil processor operates on the new sheet in the same manner as with the processing of the first sheet.

Note that there is some overlap between the data of the first sheet 204 and the data of the second sheet 205 owing to the border regions of stencils that surround an output pixel location. The overlap could be handled simply by the sheet generator re-transmitting the overlapping data twice. In alternate implementations, to feed a next sheet to the stencil processor, the sheet generator may proceed to only send new data to the stencil processor and the stencil processor reuses the overlapping data from the previous sheet.

b. Stencil Processor Design and Operation

Figure 3A:
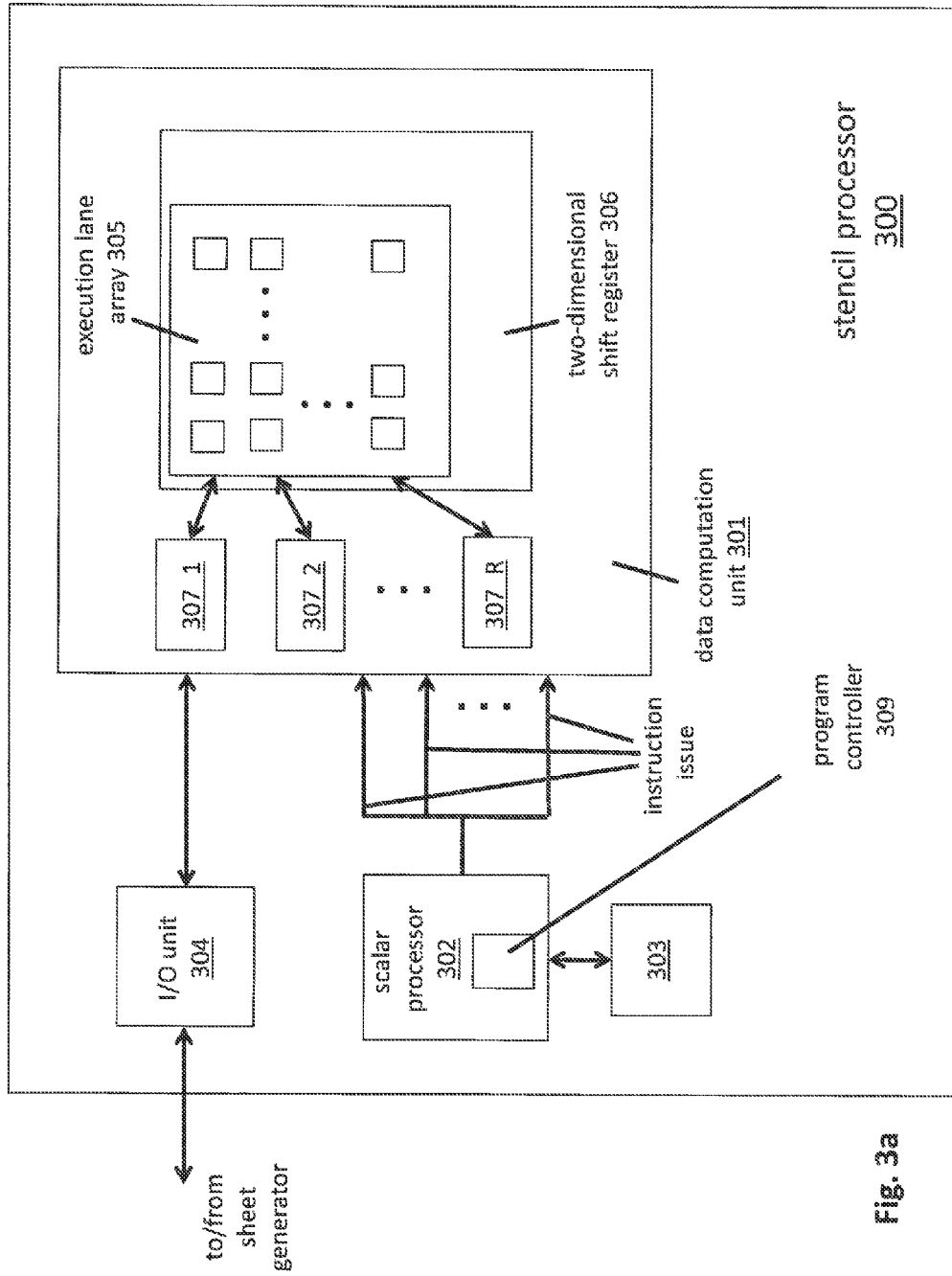
FIG. 3a shows an embodiment of a stencil processor.

FIG. 3 shows an embodiment of a stencil processor architecture 300. As observed in FIG. 3, the stencil processor includes a data computation unit 301, a scalar processor 302 and associated memory 303 and an I/O unit 304. The data computation unit 301 includes an array of execution lanes 305, a two-dimensional shift array structure 306 and separate random access memories 307 associated with specific rows or columns of the array.

The I/O unit 304 is responsible for loading "input" sheets of data received from the sheet generator into the data computation unit 301 and storing "output" sheets of data from the stencil processor into the sheet generator. In an embodiment the loading of sheet data into the data computation unit 301 entails parsing a received sheet into rows/columns of image data and loading the rows/columns of image data into the two dimensional shift register structure 306 or respective random access memories 307 of the rows/columns of the execution lane array (described in more detail below). If the sheet is initially loaded into memories 307, the individual execution lanes within the execution lane array 305 may then load sheet data into the two-dimensional shift register structure 306 from the random access memories 307 when appropriate (e.g., as a load instruction just prior to operation on the sheet's data). Upon completion of the loading of a sheet of data into the register structure 306 (whether directly from a sheet generator or from memories 307), the execution lanes of the execution lane array 305 operate on the data and eventually "write back" finished data as a sheet directly back to the sheet generator, or, into the random access memories 307. If the later the I/O unit 304 fetches the data from the random access memories 307 to form an output sheet which is then forwarded to the sheet generator.

The scalar processor 302 includes a program controller 309 that reads the instructions of the stencil processor's program code from scalar memory 303 and issues the instructions to the execution lanes in the execution lane array 305. In an embodiment, a single same instruction is broadcast to all execution lanes within the array 305 to effect a SIMD-like behavior from the data computation unit 301. In an embodiment, the instruction format of the instructions read from scalar memory 303 and issued to the execution lanes of the execution lane array 305 includes a very-long-instruction-word (VLIW) type format that includes more than one opcode per instruction. In a further embodiment, the VLIW format includes both an ALU opcode that directs a mathematical function performed by each execution lane's ALU (which, as described below, in an embodiment may specify more than one traditional ALU operation) and a memory opcode (that directs a memory operation for a specific execution lane or set of execution lanes).

The term "execution lane" refers to a set of one or more execution units capable of executing an instruction (e.g., logic circuitry that can execute an instruction). An execution lane can, in various embodiments, include more processor-like functionality beyond just execution units, however. For example, besides one or more execution units, an execution lane may also include logic circuitry that decodes a received instruction, or, in the case of more MIMD-like designs, logic circuitry that fetches and decodes an instruction. With respect to MIMD-like approaches, although a centralized program control approach has largely been described herein, a more distributed approach may be implemented in various alternative embodiments (e.g., including program code and a program controller within each execution lane of the array 305).

The combination of an execution lane array 305, program controller 309 and two dimensional shift register structure 306 provides a widely adaptable/configurable hardware platform for a broad range of programmable functions. For example, application software developers are able to program kernels having a wide range of different functional capability as well as dimension (e.g., stencil size) given that the individual execution lanes are able to perform a wide variety of functions and are able to readily access input image data proximate to any output array location.

Apart from acting as a data store for image data being operated on by the execution lane array 305, the random access memories 307 may also keep one or more look-up tables. In various embodiments one or more scalar look-up tables may also be instantiated within the scalar memory 303.

A scalar look-up involves passing the same data value from the same look-up table from the same index to each of the execution lanes within the execution lane array 305. In various embodiments, the VLIW instruction format described above is expanded to also include a scalar opcode that directs a look-up operation performed by the scalar processor into a scalar look-up table. The index that is specified for use with the opcode may be an immediate operand or fetched from some other data storage location. Regardless, in an embodiment, a look-up from a scalar look-up table within scalar memory essentially involves broadcasting the same data value to all execution lanes within the execution lane array 305 during the same clock cycle. Additional details concerning use and operation of look-up tables is provided further below.

Figure 3B:
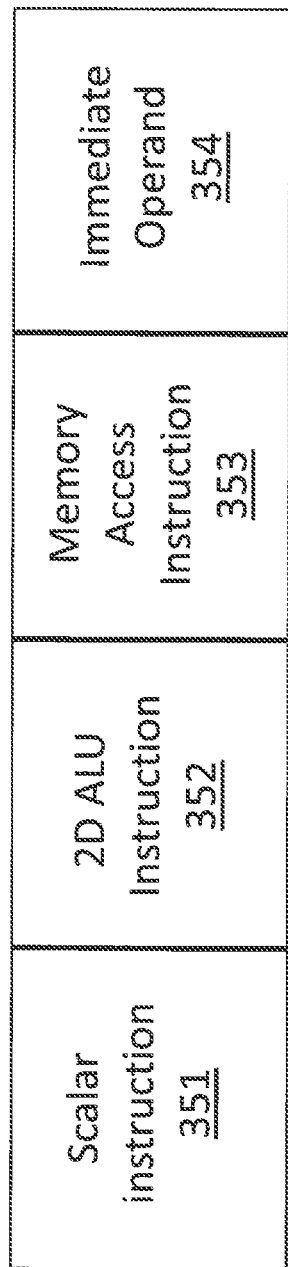
FIG. 3b shows an embodiment of an instruction word of the stencil processor.

FIG. 3b summarizes the VLIW instruction word embodiments(s) discussed above. As observed in FIG. 3b, the VLIW instruction word format includes fields for three separate instructions: 1) a scalar instruction 351 that is executed by the scalar processor; 2) an ALU instruction 352 that is broadcasted and executed in SIMD fashion by the respective ALUs within the execution lane array; and, 3) a memory instruction 353 that is broadcasted and executed in a partial SIMD fashion (e.g., if execution lanes along a same row in the execution lane array share a same random access memory, then one execution lane from each of the different rows actually execute the instruction (the format of the memory instruction 353 may include an operand that identifies which execution lane from each row executes the instruction)

A field 354 for one or more immediate operands is also included. Which of the instructions 351, 352, 353 use which immediate operand information may be identified in the instruction format. Each of instructions 351, 352, 353 also include their own respective input operand and resultant information (e.g., local registers for ALU operations and a local register and a memory address for memory access instructions). In an embodiment, the scalar instruction 351 is executed by the scalar processor before the execution lanes within the execution lane array execute either of the other two instructions 352, 353. That is, the execution of the VLIW word includes a first cycle upon which the scalar instruction 351 is executed followed by a second cycle upon with the other instructions 352, 353 may be executed (note that in various embodiments instructions 352 and 353 may be executed in parallel).

In an embodiment, the scalar instructions executed by the scalar processor include commands issued to the sheet generator to load/store sheets from/into the memories or 2D shift register of the data computation unit. Here, the sheet generator's operation can be dependent on the operation of the line buffer unit or other variables that prevent pre-runtime comprehension of the number of cycles it will take the sheet generator to complete any command issued by the scalar processor. As such, in an embodiment, any VLIW word whose scalar instruction 351 corresponds to or otherwise causes a command to be issued to the sheet generator also includes no-operation (NOOP) instructions in the other two instruction field 352, 353. The program code then enters a loop of NOOP instructions for instruction fields 352, 353 until the sheet generator completes its load/store to/from the data computation unit. Here, upon issuing a command to the sheet generator, the scalar processor may set a bit of an interlock register that the sheet generator resets upon completion of the command. During the NOOP loop the scalar processor monitors the bit of the interlock bit. When the scalar processor detects that the sheet generator has completed its command normal execution begins again.

Figure 4:
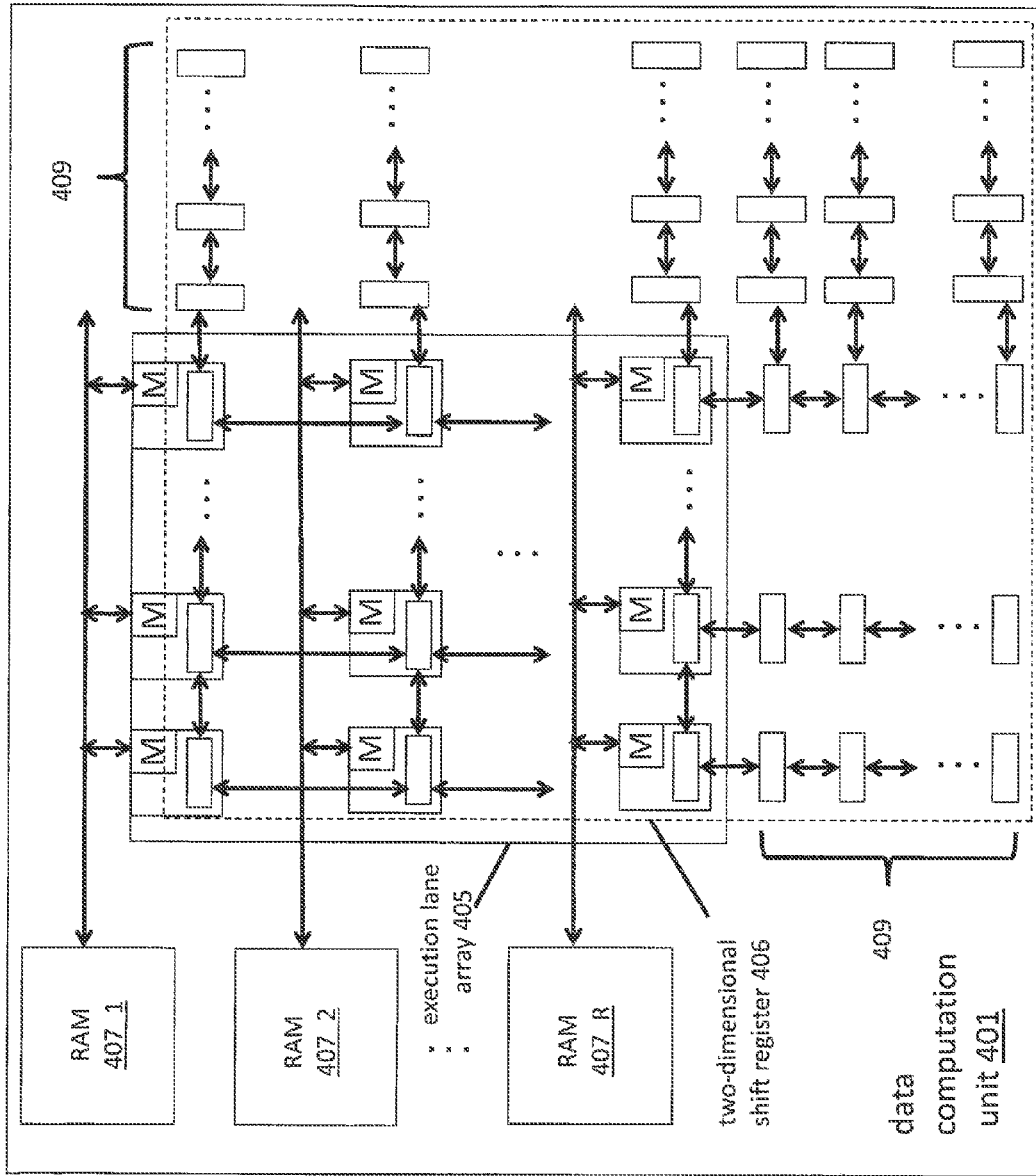
FIG. 4 shows an embodiment of a data computation unit within a stencil processor.

FIG. 4 shows an embodiment of a data computation component 401. As observed in FIG. 4, the data computation component 401 includes an array of execution lanes 405 that are logically positioned "above" a two-dimensional shift register array structure 406. As discussed above, in various embodiments, a sheet of image data provided by a sheet generator is loaded into the two-dimensional shift register 406. The execution lanes then operate on the sheet data from the register structure 406.

The execution lane array 405 and shift register structure 406 are fixed in position relative to one another. However, the data within the shift register array 406 shifts in a strategic and coordinated fashion to cause each execution lane in the execution lane array to process a different stencil within the data. As such, each execution lane determines the output image value for a different pixel in the output sheet being generated. From the architecture of FIG. 4 it should be clear that overlapping stencils are not only arranged vertically but also horizontally as the execution lane array 405 includes vertically adjacent execution lanes as well as horizontally adjacent execution lanes.

Some notable architectural features of the data computation unit 401 include the shift register structure 406 having wider dimensions than the execution lane array 405. That is, there is a "halo" of registers 409 outside the execution lane array 405. Although the halo 409 is shown to exist on two sides of the execution lane array, depending on implementation, the halo may exist on less (one) or more (three or four) sides of the execution lane array 405. The halo 405 serves to provide "spill-over" space for data that spills outside the bounds of the execution lane array 405 as the data is shifting "beneath" the execution lanes 405. As a simple case, a 5×5 stencil centered on the right edge of the execution lane array 405 will need four halo register locations further to the right when the stencil's leftmost pixels are processed. For ease of drawing, FIG. 4 shows the registers of the right side of the halo as only having horizontal shift connections and registers of the bottom side of the halo as only having vertical shift connections when, in a nominal embodiment, registers on either side (right, bottom) would have both horizontal and vertical connections.

Additional spill-over room is provided by random access memories 407 that are coupled to each row and/or each column in the array, or portions thereof (E.g., a random access memory may be assigned to a "region" of the execution lane array that spans 4 execution lanes row wise and 2 execution lanes column wise. For simplicity the remainder of the application will refer mainly to row and/or column based allocation schemes). Here, if a execution lane's kernel operations require it to process pixel values outside of the two-dimensional shift register array 406 (which some image processing routines may require) the plane of image data is able to further spill-over, e.g., from the halo region 409 into random access memory 407. For example, consider a 6×6 stencil where the hardware includes a halo region of only four storage elements to the right of a execution lane on the right edge of the execution lane array. In this case, the data would need to be shifted further to the right off the right edge of the halo 409 to fully process the stencil. Data that is shifted outside the halo region 409 would then spill-over to random access memory 407. Other applications of the random access memories 407 and the stencil processor of FIG. 3 are provided further below.

FIGS. 5a through 5k demonstrate a working example of the manner in which image data is shifted within the two dimensional shift register array "beneath" the execution lane array as alluded to above. As observed in FIG. 5a, the data contents of the two dimensional shift array are depicted in a first array 507 and the execution lane array is depicted by a frame 505. Also, two neighboring execution lanes 510 within the execution lane array are simplistically depicted. In this simplistic depiction 510, each execution lane includes a register R1 that can accept data from the shift register, accept data from an ALU output (e.g., to behave as an accumulator across cycles), or write output data into an output destination.

Each execution lane also has available, in a local register R2, the contents "beneath" it in the two dimensional shift array. Thus, R1 is a physical register of the execution lane while R2 is a physical register of the two dimensional shift register array. The execution lane includes an ALU that can operate on operands provided by R1 and/or R2. As will be described in more detail further below, in an embodiment the shift register is actually implemented with multiple (a "depth" of) storage/register elements per array location but the shifting activity is limited to one plane of storage elements (e.g., only one plane of storage elements can shift per cycle). FIGS. 5a through 5k depict one of these deeper register locations as being used to store the resultant X from the respective execution lanes. For illustrative ease the deeper resultant register is drawn alongside rather than beneath its counterpart register R2.

FIGS. 5a through 5k focus on the calculation of two stencils whose central position is aligned with the pair of execution lane positions 511 depicted within the execution lane array. For ease of illustration, the pair of execution lanes 510 are drawn as horizontal neighbors when in fact, according to the following example, they are vertical neighbors.

Figure 5B:
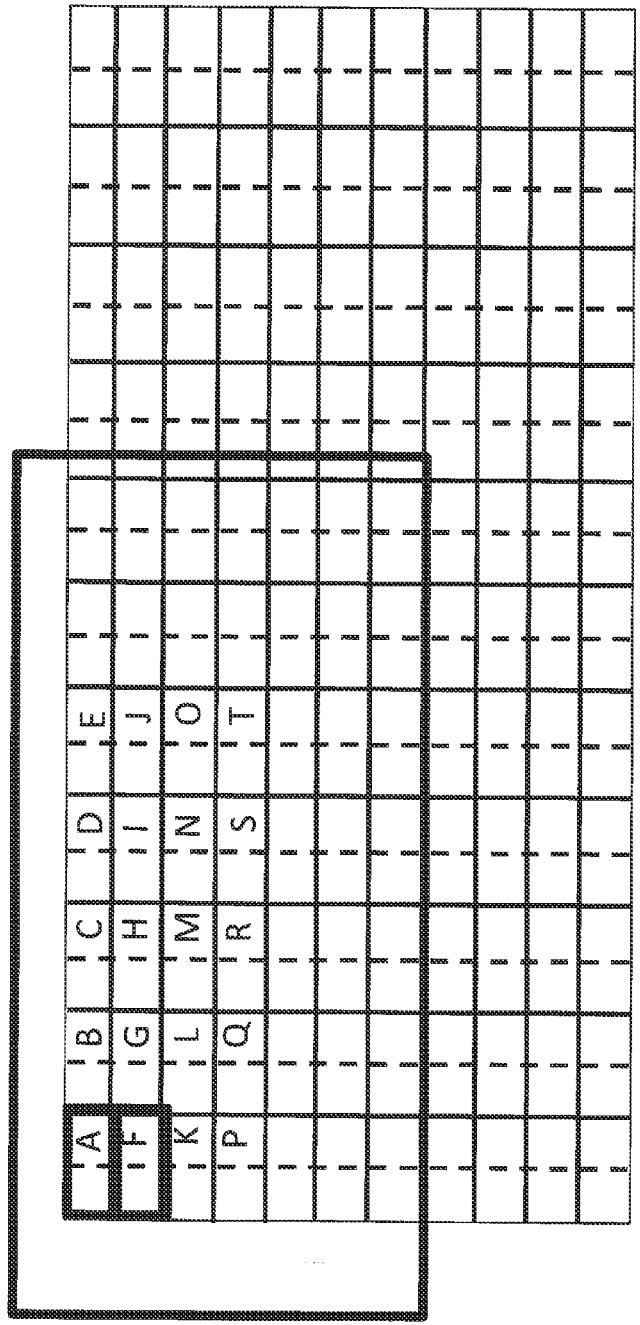

As observed initially in FIG. 5a, the execution lanes are centered on their central stencil locations. FIG. 5b shows the object code executed by both execution lanes. As observed in FIG. 5b the program code of both execution lanes causes the data within the shift register array to shift down one position and shift right one position. This aligns both execution lanes to the upper left hand corner of their respective stencils. The program code then causes the data that is located (in R2) in their respective locations to be loaded into R1.

Figure 5C:
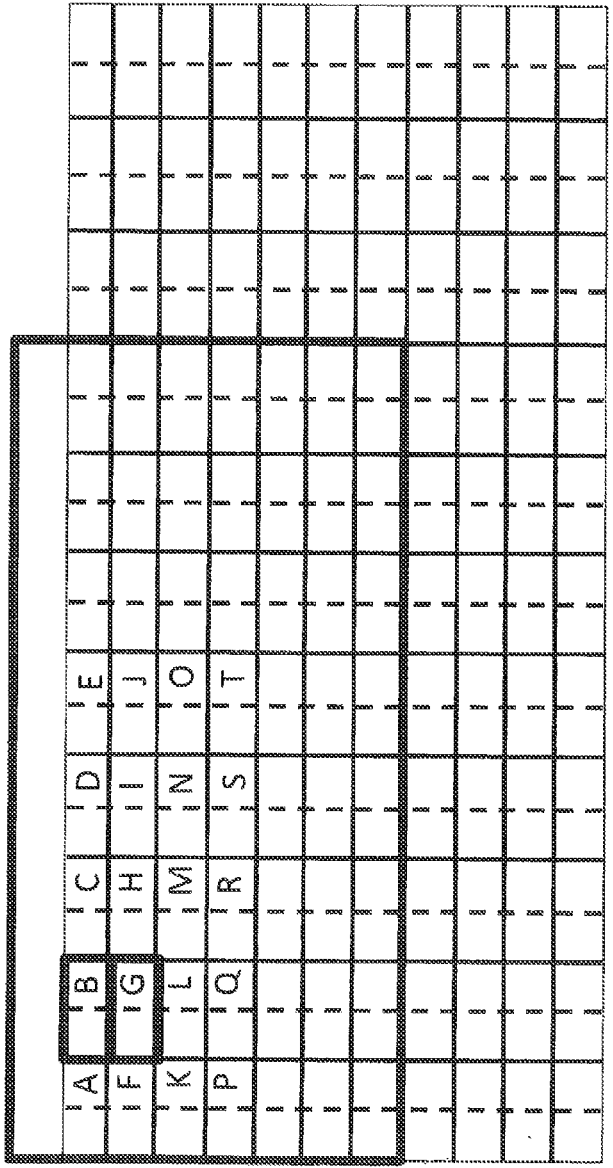
Figure 5D:
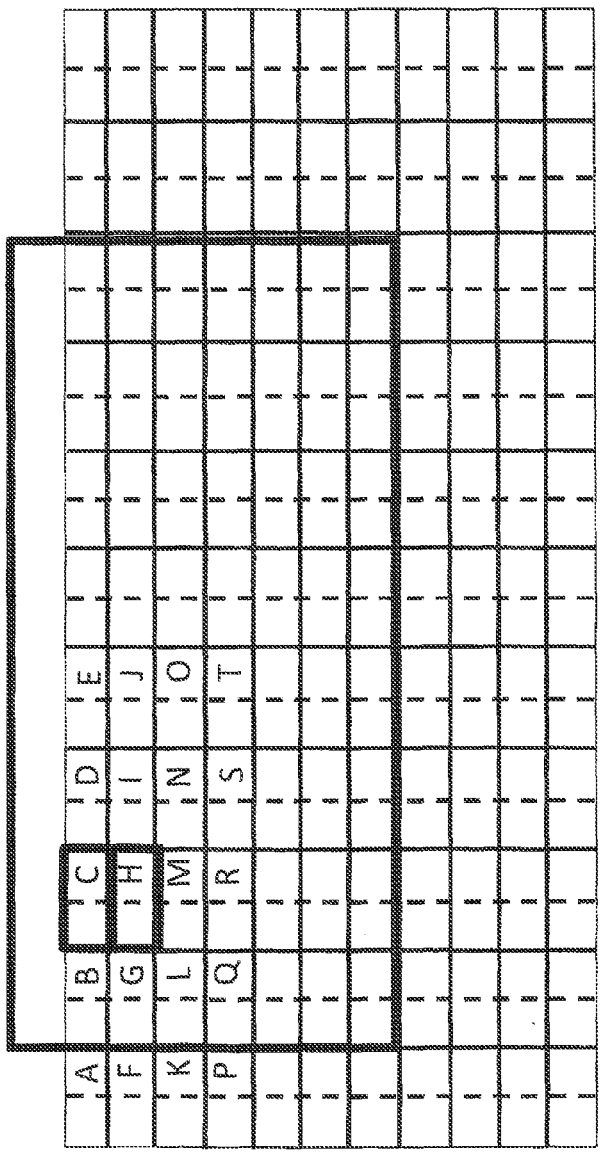

As observed in FIG. 5c the program code next causes the pair of execution lanes to shift the data within the shift register array one unit to the left which causes the value to the right of each execution lane's respective position to be shifted into each execution lane' position. The value in R1 (previous value) is then added with the new value that has shifted into the execution lane's position (in R2). The resultant is written into R1. As observed in FIG. 5d the same process as described above for FIG. 5c is repeated which causes the resultant R1 to now include the value A+B+C in the upper execution lane and F+G+H in the lower execution lane. At this point both execution lanes have processed the upper row of their respective stencils. Note the spill-over into a halo region on the left side of the execution lane array (if one exists on the left hand side) or into random access memory if a halo region does not exist on the left hand side of the execution lane array.

Figure 5E:
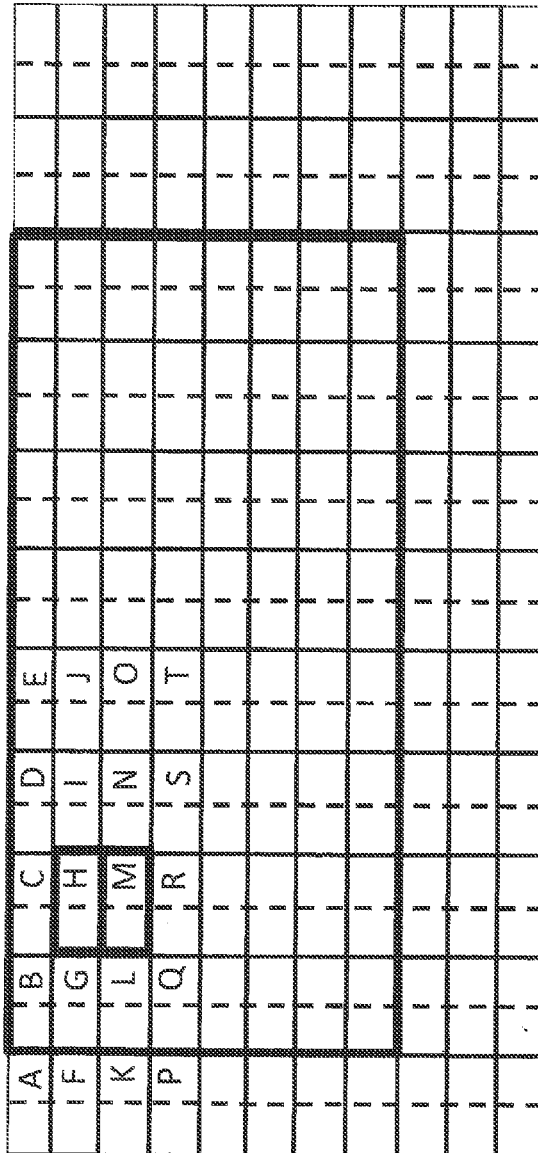
Figure 5F:
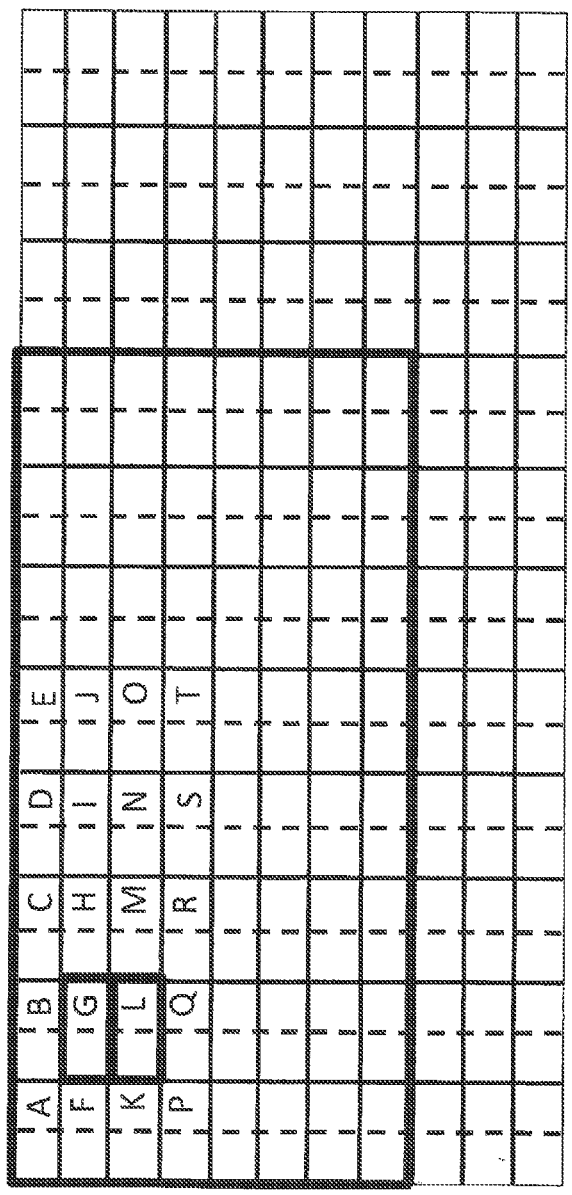

As observed in FIG. 5e, the program code next causes the data within the shift register array to shift one unit up which causes both execution lanes to be aligned with the right edge of the middle row of their respective stencils. Register R1 of both execution lanes currently includes the summation of the stencil's top row and the middle row's rightmost value. FIGS. 5f and 5g demonstrate continued progress moving leftwise across the middle row of both execution lane's stencils. The accumulative addition continues such that at the end of processing of FIG. 5g both execution lanes include the summation of the values of the top row and the middle row of their respective stencils.

Figure 5H:
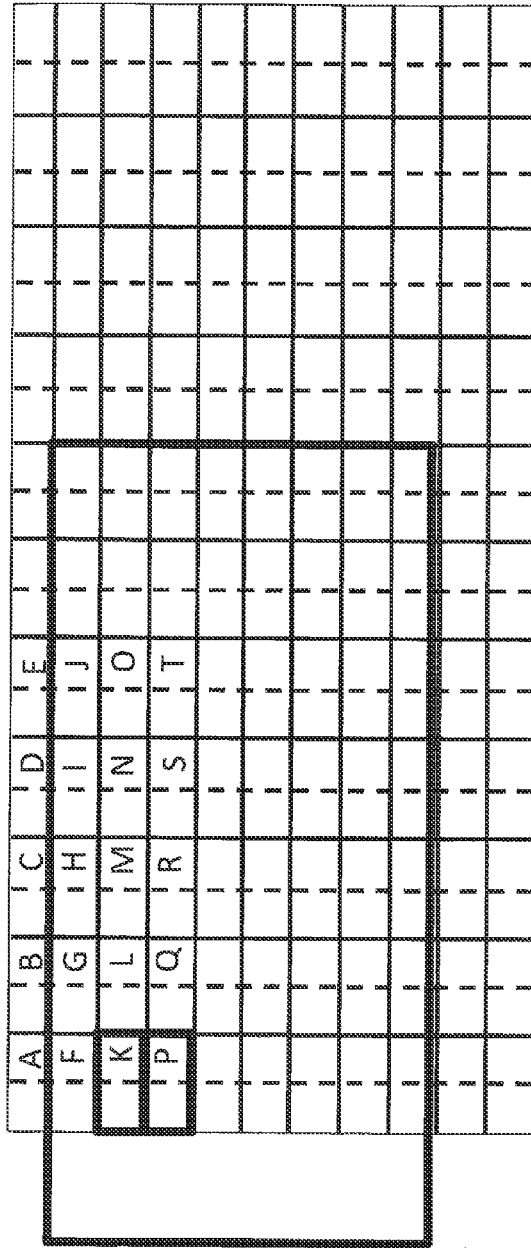
Figure 5I:
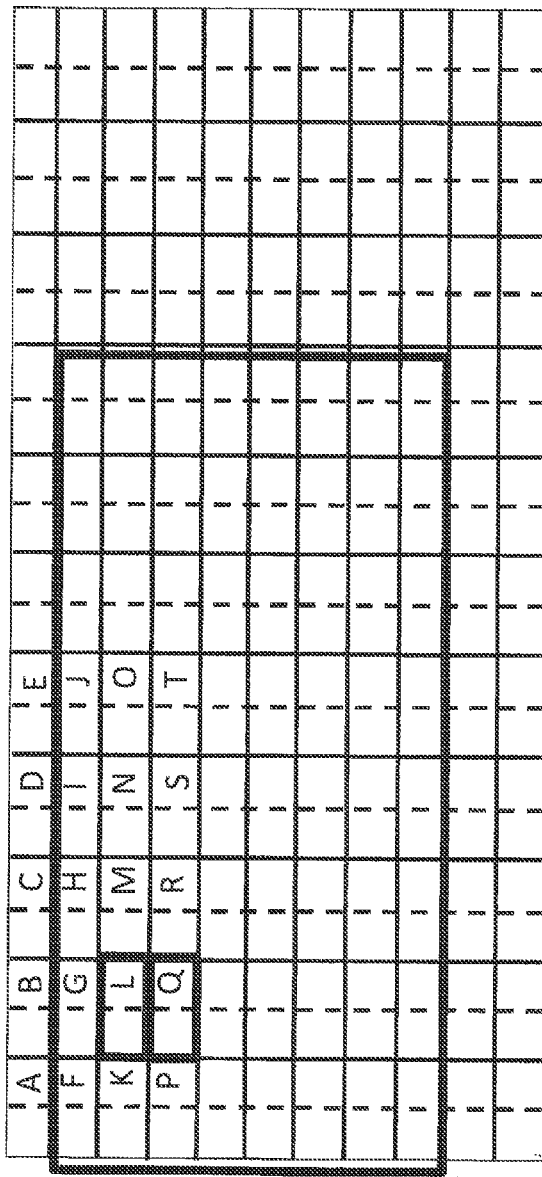
Figure 5J:
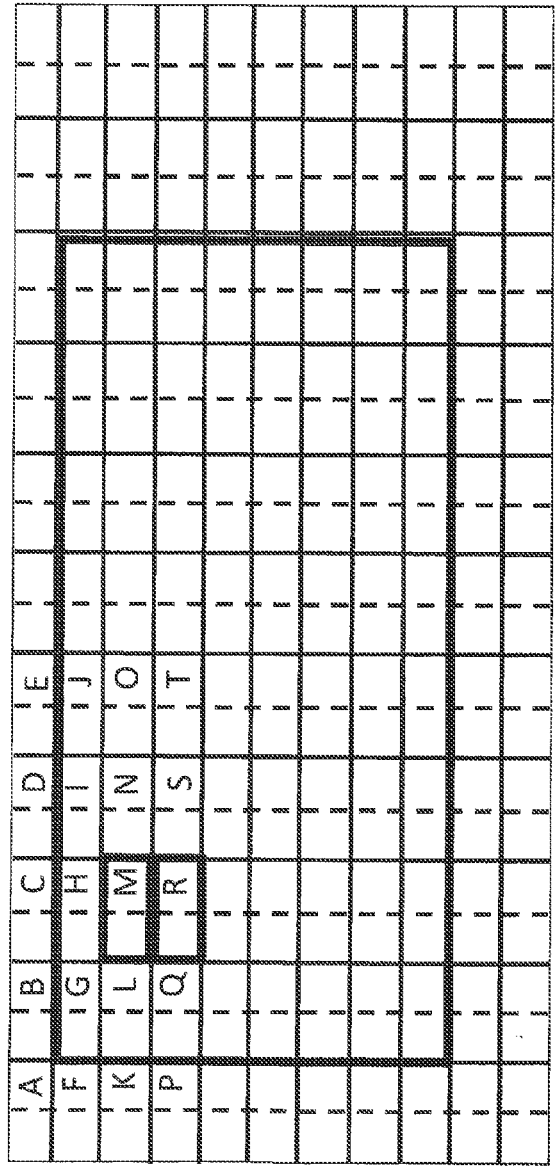
Figure 5K:
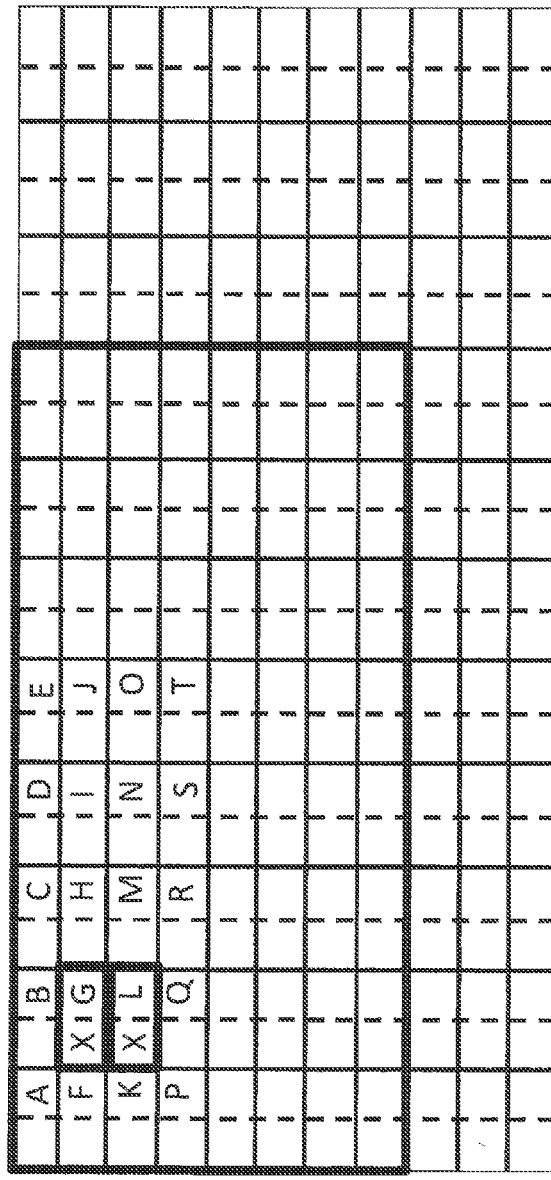

FIG. 5h shows another shift to align each execution lane with its corresponding stencil's lowest row. FIGS. 5i and 5j show continued shifting to complete processing over the course of both execution lanes' stencils. FIG. 5k shows additional shifting to align each execution lane with its correct position in the data array and write the resultant thereto.

In the example of FIGS. 5a-5k note that the object code for the shift operations may include an instruction format that identifies the direction and magnitude of the shift expressed in (X, Y) coordinates. For example, the object code for a shift up by one location may be expressed in object code as SHIFT 0, +1. As another example, a shift to the right by one location may expressed in object code as SHIFT +1, 0. In various embodiments shifts of larger magnitude may also be specified in object code (e.g., SHIFT 0, +2). Here, if the 2D shift register hardware only supports shifts by one location per cycle, the instruction may be interpreted by the machine to require multiple cycle execution, or, the 2D shift register hardware may be designed to support shifts by more than one location per cycle. Embodiments of the later are described in more detail further below.

Figure 6:
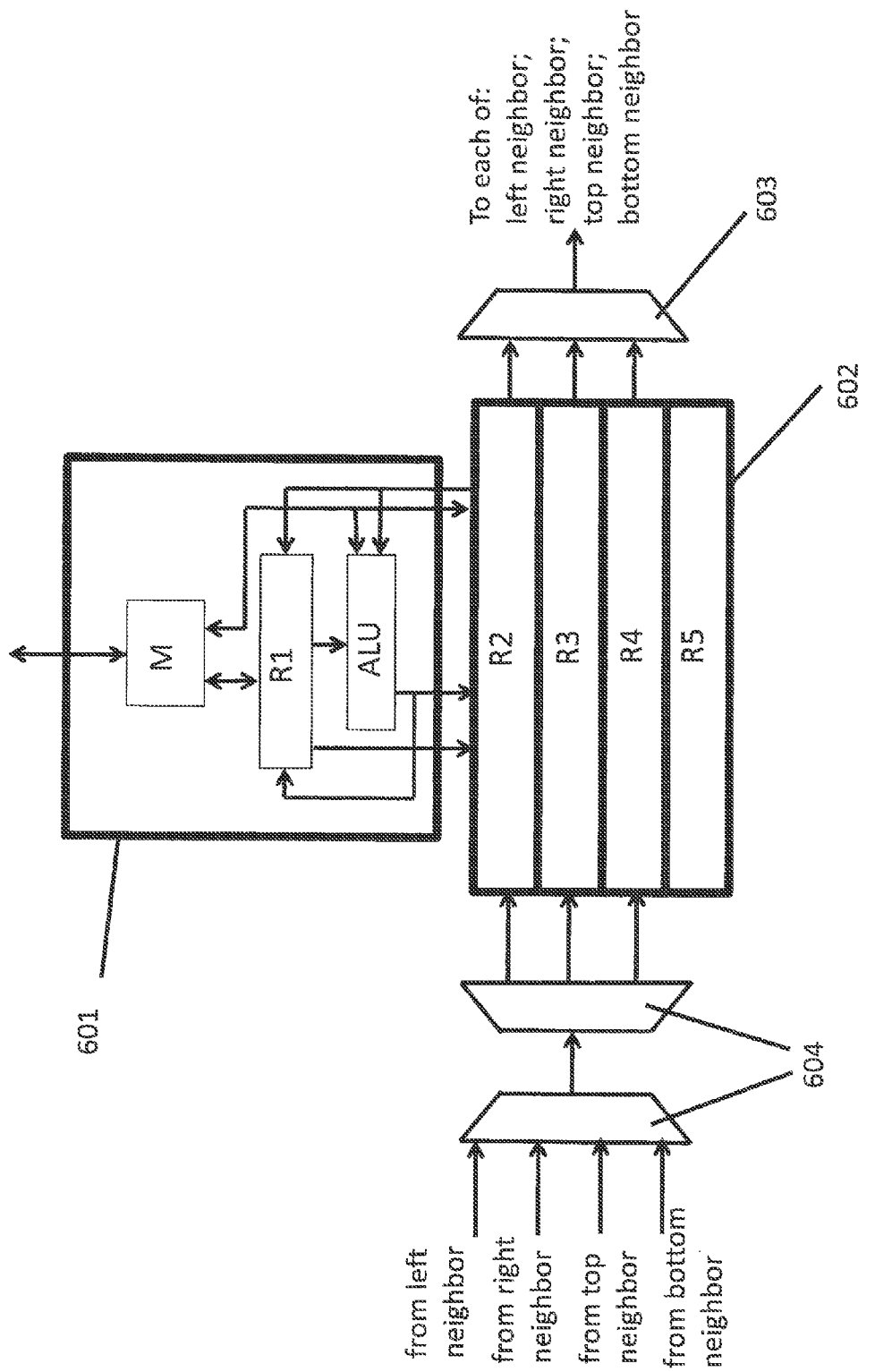
FIG. 6 shows an embodiment of a unit cell for an integrated execution lane array and two-dimensional shift array.

FIG. 6 shows another, more detailed depiction of the unit cell for the array execution lane and shift register structure (registers in the halo region do not include a corresponding execution lane). The execution lane and the register space associated with each location in the execution lane array is, in an embodiment, implemented by instantiating the circuitry observed in FIG. 6 at each node of the execution lane array. As observed in FIG. 6, the unit cell includes a execution lane 601 coupled to a register file 602 consisting of four registers R2 through R5. During any cycle, the execution lane 601 may read from or write to any of registers R1 through R5. For instructions requiring two input operands the execution lane may retrieve both of operands from any of R1 through R5.

In an embodiment, the two dimensional shift register structure is implemented by permitting, during a single cycle, the contents of any of (only) one of registers R2 through R4 to be shifted "out" to one of its neighbor's register files through output multiplexer 603, and, having the contents of any of (only) one of registers R2 through R4 replaced with content that is shifted "in" from a corresponding one if its neighbors through input multiplexers 604 such that shifts between neighbors are in a same direction (e.g., all execution lanes shift left, all execution lanes shift right, etc.). Although it may be common for a same register to have its contents shifted out and replaced with content that is shifted in on a same cycle, the multiplexer arrangement 603, 604 permits for different shift source and shift target registers within a same register file during a same cycle.

As depicted in FIG. 6 note that during a shift sequence a execution lane will shift content out from its register file 602 to each of its left, right, top and bottom neighbors. In conjunction with the same shift sequence, the execution lane will also shift content into its register file from a particular one of its left, right, top and bottom neighbors. Again, the shift out target and shift in source should be consistent with a same shift direction for all execution lanes (e.g., if the shift out is to the right neighbor, the shift in should be from the left neighbor).

Although in one embodiment the content of only one register is permitted to be shifted per execution lane per cycle, other embodiments may permit the content of more than one register to be shifted in/out. For example, the content of two registers may be shifted out/in during a same cycle if a second instance of the multiplexer circuitry 603, 604 observed in FIG. 6 is incorporated into the design of FIG. 6. Of course, in embodiments where the content of only one register is permitted to be shifted per cycle, shifts from multiple registers may take place between mathematical operations by consuming more clock cycles for shifts between mathematical operations (e.g., the contents of two registers may be shifted between math ops by consuming two shift ops between the math ops).

If less than all the content of a execution lane's register files are shifted out during a shift sequence note that the content of the non shifted out registers of each execution lane remain in place (do not shift). As such, any non shifted content that is not replaced with shifted in content persists local to the execution lane across the shifting cycle. The memory unit ("M") observed in each execution lane is used to load/store data from/to the random access memory space that is associated with the execution lane's row and/or column within the execution lane array. Here, the M unit acts as a standard M unit in that it is often used to load/store data that cannot be loaded/stored from/to the execution lane's own register space. In various embodiments, the primary operation of the M unit is to write data from a local register into memory, and, read data from memory and write it into a local register.

With respect to the ISA opcodes supported by the ALU unit of the hardware execution lane 601, in various embodiments, the mathematical opcodes supported by the hardware ALU are integrally tied with (e.g., substantially the same as) the mathematical opcodes supported by a virtual execution lane (e.g., ADD, SUB, MOV, MUL, MAD, ABS, DIV, SHL, SHR, MIN/MAX, SEL, AND, OR, XOR, NOT). As described just above, memory access instructions can be executed by the execution lane 601 to fetch/store data from/to their associated random access memory. Additionally the hardware execution lane 601 supports shift op instructions (right, left, up, down) to shift data within the two dimensional shift register structure. As described above, program control instructions are largely executed by the scalar processor of the stencil processor.

c. Configuration of Image Processor and Line Buffer Unit Operation

Figure 7:
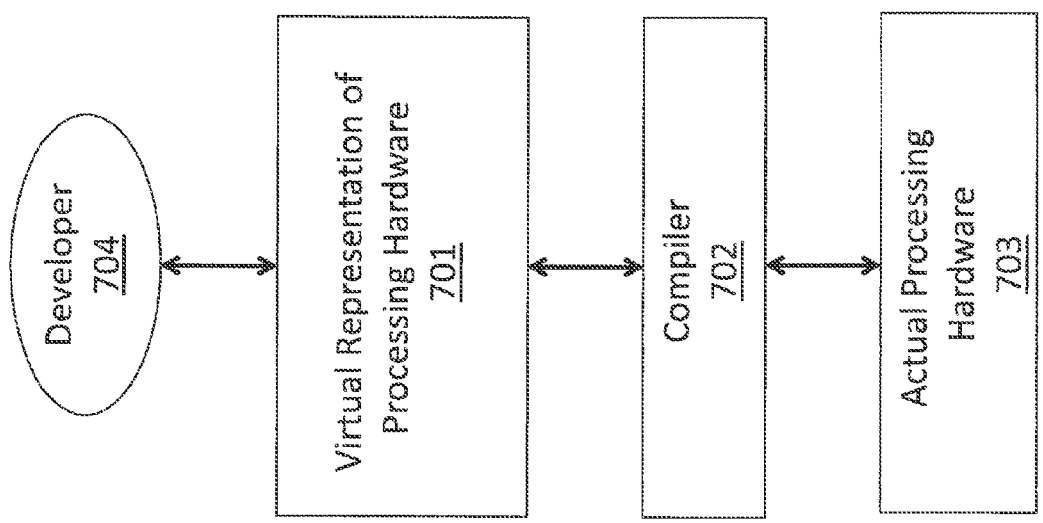
FIG. 7 shows a procedure for developing and implementing image processing program code.

FIG. 7 shows a high level view of an image processor technology platform that includes a virtual image processing environment 701, the actual image processing hardware 703 and a compiler 702 for translating higher level code written for the virtual processing environment 701 to object code that the actual hardware 703 physically executes. As described in more detail below, the virtual processing environment 701 is widely versatile in terms of the applications that can be developed and is tailored for easy visualization of an application's constituent processes. Upon completion of the program code development effort by the developer 704, the compiler 702 translates the code that was written within the virtual processing environment 701 into object code that is targeted for the actual hardware 703.

In various embodiments, program code that is written for the hardware platform is written with a unique virtual code that includes an instruction set having load and store instructions whose instruction format identifies input and output array locations as, e.g., X,Y coordinates. In various implementations, the X,Y coordinate information may actually be programmed into the hardware platform and recognized/understood by various ones of its components. This stands apart from, for example, translating the X,Y coordination (e.g., within the compiler) into different information. For example, in the case of the two-dimensional shift register structure within the stencil processor, the X,Y coordinate information is translated into register shift movements. By contrast, other parts of the hardware platform may specifically receive and comprehend the X,Y coordinate information originally expressed at the higher, virtual code level.

As observed in FIG. 8, a program code developer expresses data locations as X,Y coordinates with the special instruction format at the virtual code level 801. During the compilation stage, the virtual code is translated into program code that is actually processed by the hardware (object code) and corresponding configuration information that is loaded into the hardware's configuration (e.g., register) space. As observed in FIG. 8, in an embodiment, the object code for a particular kernel is loaded into the program space of the stencil processor's scalar processor 805.

As part of the configuration process, configuration software executing on the scalar processor 805 loads the appropriate configuration information 811, 812 into both the sheet generator unit 803 that is coupled to the stencil processor 802, and, the line buffer unit 801 that will generate new sheets for the stencil processor 802 to operate on, or, receive processed sheets generated by the stencil processor 802. Here, generally, sheets can still be contemplated in terms of X,Y coordinates of an overall image. That is, once an image or frame is defined (e.g., in terms of number of pixels per row, number of rows, number of pixels per column and number of columns), any portion or position of the image can still be referred to with X,Y coordinates.

As such, in various embodiments, either or both of the sheet generator unit 803 and line buffer unit 801 are configured with information 811, 812 within their respective configuration space 806, 807 that establishes an informational platform from which specific locations and/or regions (e.g., line groups, sheets) of an image or frame are identified in X,Y coordinates. In various implementations/uses, the X,Y coordinates may be the same X,Y coordinates expressed at the virtual code level.

Examples of such information include, e.g., the number of active line groups in the line buffer unit, the image size for each line group (e.g., as a set of four X, Y coordinates (one for each corner) or a pair of X, Y coordinates (one for a lower nearer corner and one for an upper farther corner) or absolute image width and image height, stencil size (expressed as X, Y values that define the size of a single stencil and/or the area of the overlapping stencils of the stencil processor), sheet and/or line group size (e.g., specified in same terms as an image size but having smaller dimensions), etc. Additionally, the line buffer unit 701 at least may be programmed with additional configuration information such as the number of producer kernels writing and the number of consumer kernels reading the line groups that are managed by the line buffer unit 801. The number of channels and/or the dimensions associated with the image data are also typically included as configuration information.

FIG. 9a depicts the use of X,Y coordinates to define, as just one example, line groups within an image. Here, N line groups 901_1, 901_2, . . . 901_N are observable within an image 901. As can be seen from FIG. 9a, each line group can be readily defined by reference to X, Y coordinates within the image that define, e.g., one or more of a line group's corner points. As such, in various embodiments, a line group's name or other data structure used to define a particular line group may include X, Y coordinate locations associated with the line group in order to particularly identify it.

Referring briefly back to FIG. 8, note that FIG. 8 shows that during runtime, a sheet generator 803 may request a "next" line group (or portion of a line group) from the line buffer unit 801 by, e.g., including X, Y coordinate information that defines the desired data region. FIG. 9a shows nominal "full width" line groups composed only of complete rows of image data. In an alternative configuration referred to as "virtually-tall", the line buffer unit 801 initially passes only a first upper portion of a line group as full width rows of image data. The subsequent lower rows of the line group are then specifically requested for by the sheet generator in contiguous chunks that are less than a full width row and are separately requested for. As such, multiple requests are made by the sheet generator in order to obtain the full line group. Here, each such request may define a next portion by X, Y coordinates that are attributable to the next portion.

As observed in FIG. 9b, a line buffer unit includes memory 901 in which line groups 902_1 through 902_N are stored (e.g., static or dynamic random access memory (SRAM or DRAM)). The memory 901 may be implemented on chip along with the same circuitry that implements the line buffer unit (and, e.g., the sheet generators and stencil processors), or, off chip. FIG. 9b shows the activity between the various kernels that produce and consume the line groups 902_1 through 902_N for a particular image/frame within the memory 901.

As observed in FIG. 9b, a producer kernel K1 sends new line groups to the line buffer unit 901 for storage in memory 901 over separate time instances P1, P2 through PN. The producer kernel K1 executes on a stencil processor that generates new sheets of data. The sheet generator that is coupled to the stencil processor accumulates sheets to form line groups and forwards the line groups to the line buffer unit which stores them in memory.

Also as depicted in FIG. 9b, there are two consumer kernels K2, K3 that operate on the line groups 902_1 through 902_N generated by producer kernel K1. Here, consumer kernels K2 and K3 receive the first line group 902_1 at times C21 and C31, respectively. Obviously, times C21 and C31 occur after time P1. Other restrictions may not exist. For example times C21 and/or C31 may occur before or after any of times P2 through PN. Here, the respective sheet generators for kernels K2 and K3 request a next line group at a time that is appropriate for their respective kernel. If any of kernels K2, K3 request line group 902_1 before time P1, the request idles until after line group 902_1 is actually written into memory 901.

Conceivably, requests from either or both of kernels K2 and K3 for all of line groups 902_1 through 902_N may arrive prior to time P1. Thus, line groups may be requested by consumer kernels at any time. The line groups are forwarded to the consumer kernels as they request them subject, however, to the rate at which the producer kernel K1 can produce them. In various embodiments, consumer kernels request line groups in sequence and likewise receive them in sequence (kernel K2 receives line groups 902_2 through 902_N at times C22 through C2N in sequence). For simplicity only one producer kernel is depicted for a particular line group. It is conceivable that various embodiments may be designed to permit different producers to write to a same line group (e.g., where consumers are not permitted to be serviced until after all producers have written to the line group).

In cases where there is no producer kernel (because the consumer kernel(s) is/are the first kernels in the processor's DAG processing flow), frames of image data may be transferred into memory 901 (e.g., via direct memory access (DMA) or from a camera) and parsed into line groups. In cases where there are no consumer kernel(s) (because the producer kernel is the last kernel in the processor's overall program flow), resultant line groups may be combined to form output frames.

d. Application and Structure of Kernels

FIG. 10a shows an example of the structure and form that application software written within the virtual environment may take. As observed in FIG. 10a, the program code may be expected to process one or more frames of input image data 1001 to effect some overall transformation on the input image data 1001. The transformation is realized with the operation of one or more kernels of program code 1002 that operate on the input image data in an orchestrated sequence articulated by the developer.

For example, as observed in FIG. 10a, the overall transformation is effected by first processing each input image with a first kernel K1. The output images produced by kernel K1 are then operated on by kernel K2. Each of the output images produced by kernel K2 are then operated on by kernel K3_1 or K3_2, The output images produced by kernel(s) K3_1/K3_2 are then operated on by kernel K4. Kernels K3_1 and K3_2 may be identical kernels designed to speed-up the overall processing by imposing parallel processing at the K3 stage, or, may be different kernels (e.g., kernel K3_1 operates on input images of a first specific type and kernel K3_2 operates on input images of a second, different type).

As such, the larger overall image processing sequence may take the form of a image processing pipeline or a directed acyclic graph (DAG) and the development environment may be equipped to actually present the developer with a representation of the program code being developed as such. Kernels may be developed by a developer individually and/or may be provided by an entity that supplies any underlying technology (such as the actual signal processor hardware and/or a design thereof) an/or by a third party (e.g., a vendor of kernel software written for the development environment). As such, it is expected that a nominal development environment will include a "library" of kernels that developers are free to "hook-up" in various ways to affect the overall flow of their larger development effort. Some basic kernels that are expected to be part of such a library may include kernels to provide any one or more of the following basic image processing tasks: convolutions, denoising, color space conversions, edge and corner detection, sharpening, white balance, gamma correction, tone mapping, matrix multiply, image registration, pyramid construction, wavelet transformation, block-wise discrete cosine and Fourier transformations.

As discussed above, in various embodiments, each kernel runs on its own stencil processor. For example, referring to FIG. 10a, kernel K1 runs on a first stencil processor, kernel K2 runs on a second stencil processor, etc. Additionally, as discussed above, producing and consuming kernels interface through line buffer units.

FIG. 10b depicts how the image processor could be configured to implement the DAG flow of FIG. 10a. As observed in FIG. 10b line buffer unit 1001_1 (LBU_1) receives the input image stream and parses the received frames into line groups. The switching network is configured to route line groups from LBU_1 to a first stencil processor 1002_1 upon which kernel K1 executes. Output images from kernel K1 are formatted into line groups and forwarded to a second line buffer unit 1001_2 (LBU_2). These line groups are then forwarded to a second stencil processor upon which kernel K2 executes.

From FIG. 10a, image information can be "split" from kernel K2 into either of kernels K3_1 or K3_2. Here, for instance, kernels K3_1 and K3_2 may process different channels associated with the overall image being processed. For example, kernel K3_1 may process red (R) images while kernel K3_2 may process green (G) and blue (B) images. Alternatively, K3_1 may process visual images while kernel K3_2 may process depth images (e.g., taken from a time-of-flight depth imaging camera along with the visual images). Regardless, all channels of the image are processed by kernels K1 and K2 but different channels of the image are processed with different kernels K3_1 and K3_2. Further still, kernels K3_1 and K3_2 may be separate instances of the same (e.g., extremely numerically intensive) program code and two stencil processors are used to speed-up the processing of the K3 function by executing it in parallel.

Regardless, the aforementioned "split" causes some line group image information from kernel K2 to be buffered into a third line buffer unit 1001_3 (LBU_3) and other line group image information from kernel K2 to be buffered into a fourth line buffer unit 1001_4 (LBU_4). The line groups that are buffered in the LBU_3 line buffer unit are forwarded to a third stencil processor 1002_3 on which kernel K3_1 executes. The line groups that are buffered in the LBU_4 line buffer unit are forwarded to a fourth stencil processor 1002_4 on which kernel K3_2 executes. Output line groups from kernels K3_1 and K3_2 are respectively buffered in fifth and sixth line buffer units 1001_4 (LBU_5), 1001_5 (LBU_6). The line groups from the LBU_5 and LBU_6 line buffer units are then passed to a fifth stencil processor 1002_5 that executes kernel K4. Note that the split line groups merge again at the fifth stencil processor 1002_5.

FIGS. 11a and 11b pertain to a more straightforward pipelined approach where each stencil processor receives a line group from an immediately preceding stage and provides a for an immediately following stage. Specifically, line buffer units 1101_1 (LBU_1), 1101_2 (LBU_2), 1101_3 (LBU_3), 1101_4 (LBU_4) respectively feed stencil processors 1102_1, 1102_2, 1102_3, 1102_4 that respectively execute kernels K1, K2, K3 and K4. Stencil processors 1102_1, 1102_2, 1102_3, 1102_4 also respectively feed line buffer units 1101_2 (LBU_2), 1101_3 (LBU_3), 1101_4 (LBU_4), 1101_5 (LBU_5).

FIG. 11c shows another pipelined approach that essentially executes two pipelines in parallel (K1-K3- . . . ) and (K2-K4- . . . ). This configuration can be used to speed up a pipeline through parallel execution (e.g., kernels K1 and K2 are the same, and, kernels K3 and K4 are the same), or, two different pipelines are used depending on image data context (e.g., one pipeline processes one kind of channel and the other pipeline processes the other kind of channel).

In each of FIGS. 11b, 11b and 11c note the different configurations that will need to be made to the connection network 1004/1104 to connect the stencil processors to the source and sink line groups in the appropriate manner.

In various embodiments, the image processor includes appropriate configuration space (e.g., implemented with configuration registers and/or random access memory (such as the scalar processor's scalar memory)) in which to keep configuration information to implement any of a myriad of various configurations (e.g., DAG, image processing pipeline). Some exemplary configuration parameters include: 1) Number of Source Images (the number of source image frames that are streamed into the system, from e.g., either a camera or a larger computer system's main memory); 2) Number of Line groups (the total number of line groups configured for within the line buffer units in the system); 3) Number of Active Stencil Processors (the total number of active stencil processors in the system); 4) Number of Input Line Groups Per Stencil Processor (one stencil processor can handle more than one input image frame, Num_Input_LGs_perStencil essentially indicates how many different input image frames the stencil processor will handle); 5) Number of Output Line Groups Per Stencil Processor (one stencil processor can handle more than one output image frame, Num_Output_LGs_perStencil essentially indicates how many different output image frames the stencil processor will handle); 6) Number of Consumers Per Line Group (for each line group configured for in each line buffer unit, Num_Cons_per_LG indicates how many consumers the line group has). Other types of configuration information may be accepted by the system based on any of the features, structures or operations of the system described above.

e. Implementation Embodiments

It is pertinent to point out that the various image processor architecture features described above are not necessarily limited to image processing in the traditional sense and therefore may be applied to other applications that may (or may not) cause the image processor to be re-characterized. For example, if any of the various image processor architecture features described above were to be used in the creation and/or generation and/or rendering of animation as opposed to the processing of actual camera images, the image processor may be characterized as a graphics processing unit. Additionally, the image processor architectural features described above may be applied to other technical applications such as video processing, vision processing, image recognition and/or machine learning. Applied in this manner, the image processor may be integrated with (e.g., as a co-processor to) a more general purpose processor (e.g., that is or is part of a CPU of computing system), or, may be a stand alone processor within a computing system.

The hardware design embodiments discussed above may be embodied within a semiconductor chip and/or as a description of a circuit design for eventual targeting toward a semiconductor manufacturing process. In the case of the later, such circuit descriptions may take of the form of higher/behavioral level circuit descriptions (e.g., a VHDL description) or lower level circuit description (e.g., a register transfer level (RTL) description, transistor level description or mask description) or various combinations thereof. Circuit descriptions are typically embodied on a computer readable storage medium (such as a CD-ROM or other type of storage technology).

From the preceding sections is pertinent to recognize that an image processor as described above may be embodied in hardware on a computer system (e.g., as part of a handheld device's System on Chip (SOC) that processes data from the handheld device's camera). In cases where the image processor is embodied as a hardware circuit, note that the image data that is processed by the image processor may be received directly from a camera. Here, the image processor may be part of a discrete camera, or, part of a computing system having an integrated camera. In the case of the later the image data may be received directly from the camera or from the computing system's system memory (e.g., the camera sends its image data to system memory rather than the image processor). Note also that many of the features described in the preceding sections may be applicable to a graphics processor unit (which renders animation).

FIG. 12 provides an exemplary depiction of a computing system. Many of the components of the computing system described below are applicable to a computing system having an integrated camera and associated image processor (e.g., a handheld device such as a smartphone or tablet computer). Those of ordinary skill will be able to easily delineate between the two.

As observed in FIG. 12, the basic computing system may include a central processing unit 1201 (which may include, e.g., a plurality of general purpose processing cores 1215_1 through 1215_N and a main memory controller 1217 disposed on a multi-core processor or applications processor), system memory 1202, a display 1203 (e.g., touchscreen, flat-panel), a local wired point-to-point link (e.g., USB) interface 1204, various network I/O functions 1205 (such as an Ethernet interface and/or cellular modem subsystem), a wireless local area network (e.g., WiFi) interface 1206, a wireless point-to-point link (e.g., Bluetooth) interface 1207 and a Global Positioning System interface 1208, various sensors 1209_1 through 1209_N, one or more cameras 1210, a battery 1211, a power management control unit 1212, a speaker and microphone 1213 and an audio coder/decoder 1214.

An applications processor or multi-core processor 1250 may include one or more general purpose processing cores 1215 within its CPU 1201, one or more graphical processing units 1216, a memory management function 1217 (e.g., a memory controller), an I/O control function 1218 and an image processing unit 1219. The general purpose processing cores 1215 typically execute the operating system and application software of the computing system. The graphics processing units 1216 typically execute graphics intensive functions to, e.g., generate graphics information that is presented on the display 1203. The memory control function 1217 interfaces with the system memory 1202 to write/read data to/from system memory 1202. The power management control unit 1212 generally controls the power consumption of the system 1200.

The image processing unit 1219 may be implemented according to any of the image processing unit embodiments described at length above in the preceding sections. Alternatively or in combination, the IPU 1219 may be coupled to either or both of the GPU 1216 and CPU 1201 as a co-processor thereof. Additionally, in various embodiments, the GPU 1216 may be implemented with any of the image processor features described at length above.

Each of the touchscreen display 1203, the communication interfaces 1204-1207, the GPS interface 1208, the sensors 1209, the camera 1210, and the speaker/microphone codec 1213, 1214 all can be viewed as various forms of I/O (input and/or output) relative to the overall computing system including, where appropriate, an integrated peripheral device as well (e.g., the one or more cameras 1210). Depending on implementation, various ones of these I/O components may be integrated on the applications processor/multi-core processor 1250 or may be located off the die or outside the package of the applications processor/multi-core processor 1250.

In an embodiment one or more cameras 1210 includes a depth camera capable of measuring depth between the camera and an object in its field of view. Application software, operating system software, device driver software and/or firmware executing on a general purpose CPU core (or other functional block having an instruction execution pipeline to execute program code) of an applications processor or other processor may perform any of the functions described above.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired and/or programmable logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:
1. An apparatus, comprising:
an image processing unit, comprising:
 a network;
 a plurality of stencil processor circuits each comprising an array of execution unit lanes coupled to a two-dimensional shift register array structure that supports bi-directional data movements along a horizontal axis and supports bi-directional data movements along a vertical axis, the array of execution unit lanes and the two-dimensional shift register to simultaneously process multiple overlapping stencils through execution of program code;
 a plurality of sheet generators respectively coupled between the plurality of stencil processors and the network, the sheet generators to parse input line groups of image data into input sheets of image data for processing by the stencil processors, and, to form output line groups of image data from output sheets of image data received from the stencil processors;
 a plurality of line buffer units coupled to the network to pass line groups of image data in a direction from producing stencil processors to consuming stencil processors to implement an overall program flow.
2. The apparatus of claim 1 wherein the image processing unit is configurable to implement a DAG overall program flow.
3. The apparatus of claim 1 wherein the image processing unit is configurable to implement an image processing pipeline flow.
4. The apparatus of claim 1 wherein the image processing unit is configurable to cause a producing stencil processor to feed more than one consuming stencil processor.
5. The apparatus of claim 1 wherein the image processing unit is configurable to cause a consuming stencil processor to be fed by more than one producing stencil processor.

6. The apparatus of claim 1 wherein the image processing unit is configurable to simultaneously process different image streams with different stencil processors.

7. The apparatus of claim 1 wherein the array of execution unit lanes operate in SIMD fashion.

8. A non transitory machine readable storage medium containing program code that when processed by a computing system causes the computing system to simulate behavioral operation of an electronic circuit, said electronic circuit comprising:
an image processing unit, comprising:
a network;
a plurality of stencil processor circuits each comprising an array of execution unit lanes coupled to a two-dimensional shift register array structure that supports bi-directional data movements along a horizontal axis and supports bi-directional data movements along a vertical axis, the array of execution unit lanes and the two-dimensional shift register to simultaneously process multiple overlapping stencils through execution of program code;
a plurality of sheet generators respectively coupled between the plurality of stencil processors and the network, the sheet generators to parse input line groups of image data into input sheets of image data for processing by the stencil processors, and, to form output line groups of image data from output sheets of image data received from the stencil processors;
a plurality of line buffer units coupled to the network to pass line groups of image data in a direction from producing stencil processors to consuming stencil processors to implement an overall program flow.

9. The machine readable storage medium of claim 8 wherein the image processing unit is configurable to implement a DAG overall program flow.

10. The machine readable storage medium of claim 8 wherein the image processing unit is configurable to implement an image processing pipeline flow.

11. The machine readable storage medium of claim 8 wherein the image processing unit is configurable to cause a producing stencil processor to feed more than one consuming stencil processor.

12. The machine readable storage medium of claim 8 wherein the image processing unit is configurable to cause a consuming stencil processor to be fed by more than one producing stencil processor.

13. The machine readable storage medium of claim 8 wherein the image processing unit is configurable to simultaneously process different image streams with different stencil processors.

14. The machine readable storage medium of claim 8 wherein the array of execution unit lanes operate in SIMD fashion.

15. A computing system, comprising:
an image processing unit, comprising:
a network;
a plurality of stencil processor circuits each comprising an array of execution unit lanes coupled to a two-dimensional shift register array structure that supports bi-directional data movements along a horizontal axis and supports bi-directional data movements along a vertical axis to simultaneously process multiple overlapping stencils through execution of program code;
a plurality of sheet generators respectively coupled between the plurality of stencil processors and the network, the sheet generators to parse input line groups of image data into input sheets of image data for processing by the stencil processors, and, to form output line groups of image data from output sheets of image data received from the stencil processors;
a plurality of line buffer units coupled to the network to pass line groups of image data in a direction from producing stencil processors to consuming stencil processors to implement an overall program flow.

16. The computing system of claim 15 wherein the image processing unit is configurable to implement a DAG overall program flow.

17. The computing system of claim 15 wherein the image processing unit is configurable to implement an image processing pipeline flow.

18. The computing system of claim 15 wherein the image processing unit is configurable to cause a producing stencil processor to feed more than one consuming stencil processor.

19. The computing system of claim 15 wherein the image processing unit is configurable to cause a consuming stencil processor to be fed by more than one producing stencil processor.

20. The computing system of claim 15 wherein the image processing unit is configurable to simultaneously process different image streams with different stencil processors.

21. The computing system of claim 15 wherein the array of execution unit lanes operate in SIMD fashion.

* * * * *